United States Patent
Beachley

(10) Patent No.: US 10,663,378 B2
(45) Date of Patent: May 26, 2020

(54) EMBEDDED MARKING OF SECTIONABLE TISSUE SAMPLES

(71) Applicant: Rowan University, Glassboro, NJ (US)

(72) Inventor: Vince Beachley, Collingswood, NJ (US)

(73) Assignee: Rowan University, Glassboro, NJ (US)

( * ) Notice: Subject to any disclaimer, the term of this patent is extended or adjusted under 35 U.S.C. 154(b) by 176 days.

(21) Appl. No.: 15/567,288

(22) PCT Filed: Apr. 18, 2016

(86) PCT No.: PCT/US2016/028110
§ 371 (c)(1),
(2) Date: Oct. 17, 2017

(87) PCT Pub. No.: WO2016/168821
PCT Pub. Date: Oct. 20, 2016

(65) Prior Publication Data
US 2018/0120203 A1 May 3, 2018

Related U.S. Application Data

(60) Provisional application No. 62/149,196, filed on Apr. 17, 2015.

(51) Int. Cl.
*G01N 1/00* (2006.01)
*G01N 1/36* (2006.01)
*A01N 1/02* (2006.01)

(52) U.S. Cl.
CPC ............. *G01N 1/36* (2013.01); *A01N 1/0263* (2013.01); *G01N 2001/364* (2013.01); *G01N 2001/366* (2013.01); *G01N 2001/368* (2013.01)

(58) Field of Classification Search
CPC ........................................................ G01N 1/00
See application file for complete search history.

(56) References Cited

U.S. PATENT DOCUMENTS

| | | | |
|---|---|---|---|
| 5,487,526 A | 1/1996 | Hupp | |
| 6,017,476 A | 1/2000 | Renshaw | |
| 7,227,630 B1 * | 6/2007 | Zavislan | G02B 21/0028 356/244 |
| 7,828,539 B1 | 11/2010 | Beachley et al. | |

(Continued)

OTHER PUBLICATIONS

Zussman et al., "Mechanical and structural characterization of electrospun PAN-derived carbon nanofibers," Carbon (2005); 43(10)2175-2185.

(Continued)

*Primary Examiner* — Jyoti Nagpaul
(74) *Attorney, Agent, or Firm* — Saul Ewing Arnstein & Lehr LLP; Domingos J. Silva; Paul A. Leicht

(57) ABSTRACT

Tissue samples embedded in settable, sectionable media such as paraffin can be cut into sections. Embedding one or more sectionable fiducial indicia in the medium permits identification of the plane along which the medium has been cut. However, prior methods of inserting indicia into embedded tissue sample blocks are cumbersome and difficult to perform. Sectionable fiducial indicia can be embedded in a block of medium by releasibly fixing the indicia to the sidewall or base of a mold used to shape the tissue block during embedding of a tissue sample in the medium block.

20 Claims, 15 Drawing Sheets

(56) References Cited

U.S. PATENT DOCUMENTS

| 8,580,181 B1 | 11/2013 | Beachley et al. |
| 2010/0248301 A1 | 9/2010 | Ulbrich et al. |
| 2014/0273079 A1 | 9/2014 | McCormick |
| 2015/0113841 A1* | 4/2015 | Ebrom ................ H05K 1/0274 40/451 |
| 2015/0160104 A1 | 6/2015 | Berberich |

OTHER PUBLICATIONS

Rahaman et al, "A review of heat tgreatment on polyacrylonitrile fibert," Polymer Degradation and Stability (2007); 92 (8):1421-1432.

Ozbek et al., "Strain-induced density changes in PAN-based carbon fibres," Carbon (2000); 38(14):2007-2016.

Persano et al., "Industrial Upscaling of Electrospinning and Applications of Ppolymer nanofibers: A Review," Macromol. Mater. Eng. (2013); 298:504-520.

Yao et al., "High Strength and High Modulus Electrospun Nanofibers," Fibers (2014); 2(2):158-186.

\* cited by examiner

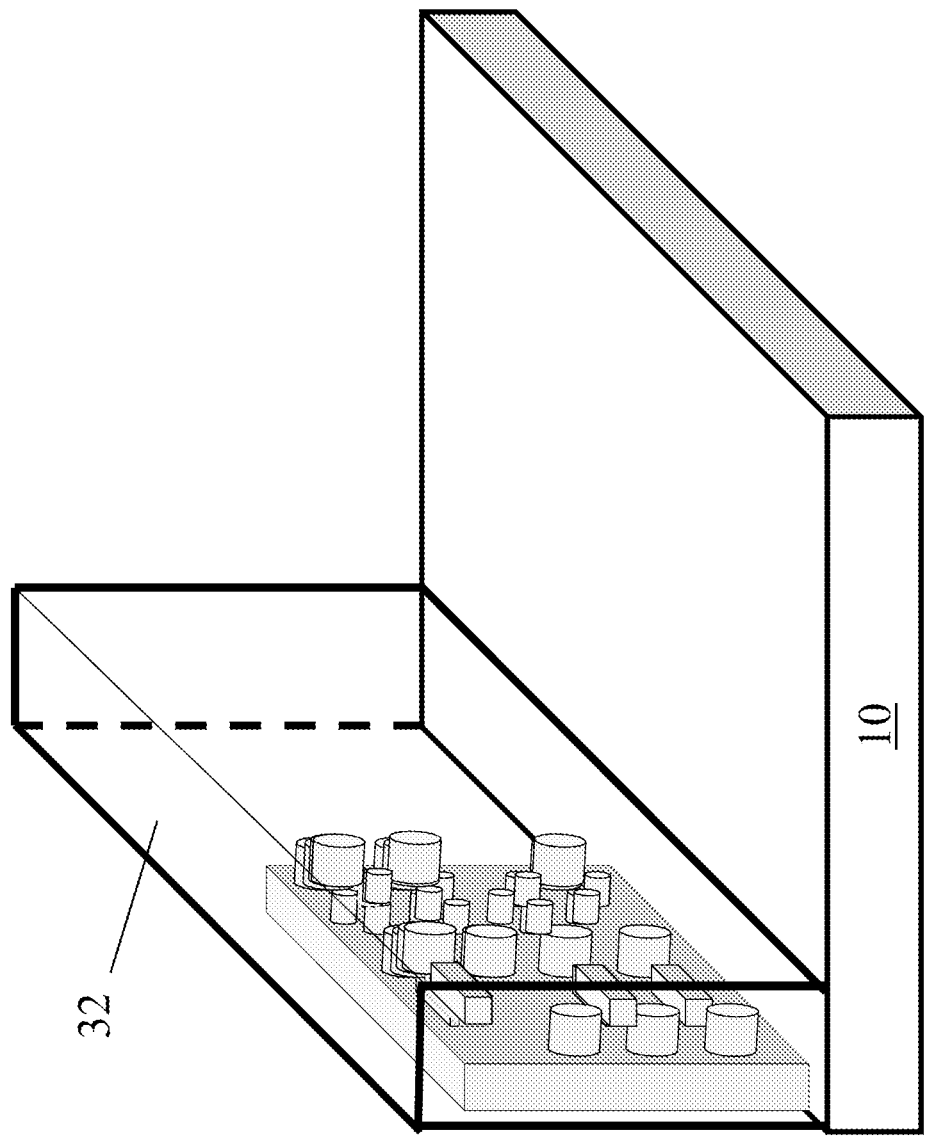

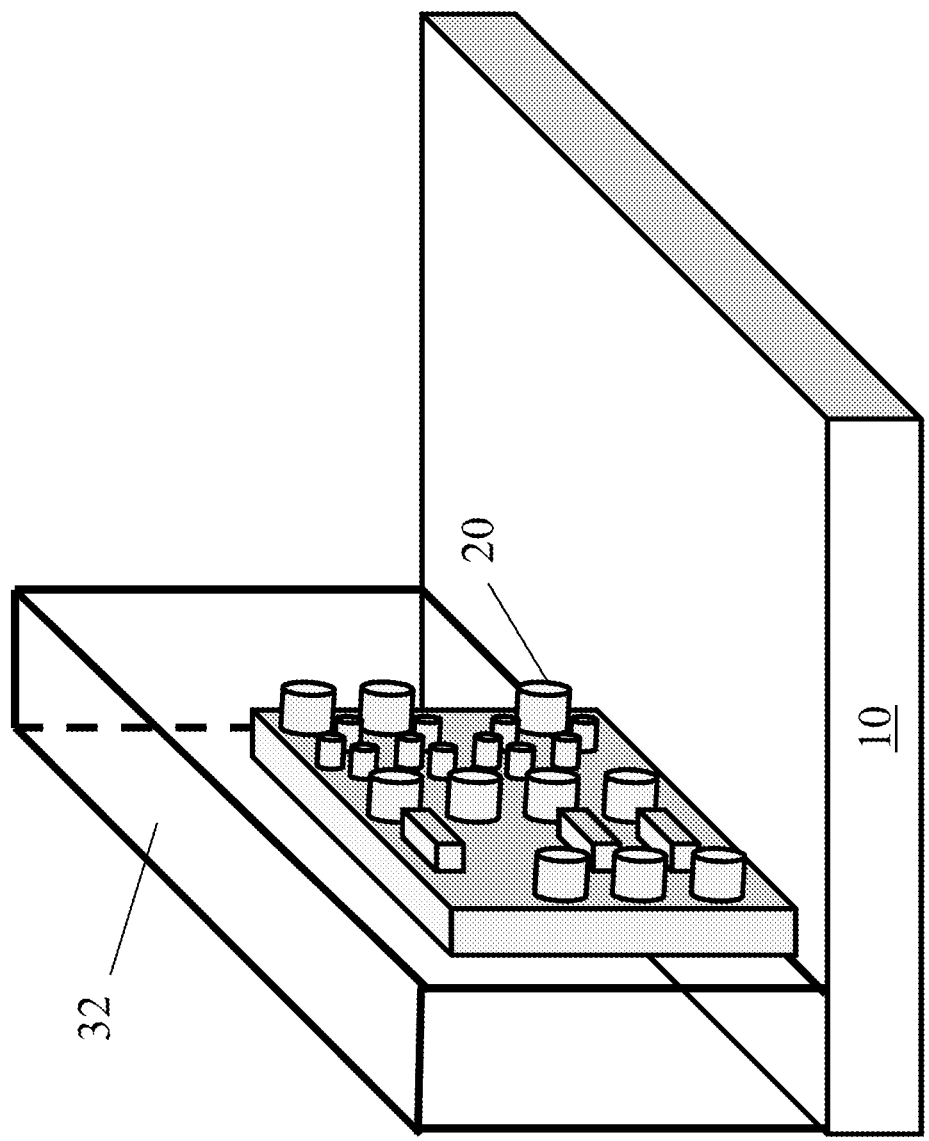

EMBEDDED MARKING OF SECTIONABLE TISSUE SAMPLES

CROSS-REFERENCE TO RELATED APPLICATIONS

This application is a 35 U.S.C. § 371 National Stage application of, and claims priority to, International Patent Application No. PCT/US2015/028110, Filed Apr. 18, 2016, which claims priority under 35 U.S.C. § 119(e) to U.S. Provisional Patent Application Ser. No. 62/149,196, filed on Apr. 17, 2015, all of which applications are incorporated herein by reference in their entireties.

FIELD OF THE INVENTION

The disclosure relates generally to the field of histology, and more specifically to the field of analysis of tissue samples embedded in a medium, such as for sectioning.

BACKGROUND OF THE DISCLOSURE

Histological analysis of cells and tissues obtained, for example, from plants or animals, often involves microscopic analysis of such materials. The cells of most multicellular organisms are disposed in tissues, which can include one or more of living, dead, or inactive cells of various types, extracellular materials (e.g., intracellular matrices produced by the animal or plant), voids or spaces, and heterogenous materials (e.g., cells of other organisms, such as parasites or pathogens, or non-living materials such as mineral particles or other inclusions. Histological analysis seeks to reveal information about the three-dimensional arrangements of such elements, interactions among them, and phenomena attributable to their positions. Localization of particular tissues, cells, or subcellular components within an embedded tissue sample can be desirable for many purposes.

Analysis of three-dimensional biological samples, either in situ (e.g., as the sample occurs on or within the body of an organism) or in an extracted sample (e.g., in a tissue biopsy) is hindered by the nearness of sample components to one another and the 'shielding' effect of components which surround or overlie other components. That is, it can be difficult to interpret results obtained using an analytical technique from different components of a three-dimensional biological sample owing to inability to distinguish analytical results attributable to different components of the sample. A well known technique for resolving analytical signals arising from different components of a three-dimensional sample is to cut the sample into sections and to observe the results of analytical techniques applied either to an entire section (e.g., a thin slice of a three-dimensional section) or to a surface of the section (e.g., a two-dimensional surface of a halved block having a tissue sample embedded therein).

Many methods of embedding tissue samples in a medium and thereafter cutting or slicing the medium into pieces or thin sections are known. For example, many standardized protocols are known for fixing tissues in a solution (e.g., a formalin-containing solution), optionally treating the tissues (e.g., contacting the tissue with a label to identify components or with a reagent to modify the tissue, such as to decalcify bone), infusing a stable medium (e.g., paraffin or another wax or a polymer resin such as an acrylic or epoxy resin) into the tissue to form a block in which the tissue is suspended, and thereafter cutting the block (e.g., slicing thin sections from the block using a microtome to yield a plurality of substantially parallel 5-micrometer-thick slices of the block analogous to slices of a loaf of bread) to yield sections suitable for analysis (optionally after further treatment, such as with a tissue-reactive reagent or label). A skilled artisan in this field understands that a wide variety of materials, techniques, and cutting geometries can be employed, depending on the identity of the tissue being analyzed, the reactive or labeling techniques to be employed, and the detection (e.g., light or electron microscopy) technology to be used. Selections of these materials, criteria, and techniques are routine in the art and are not the subject matter to which the current disclosure is directed.

A difficulty inherent in sectioning a block having a tissue sample embedded therein is determining where the cut was made, relative to the dimensions of the block, relative to the dimensions of the embedded tissue sample, or both. For example, when a sample block is sliced into a multiplicity of slices of substantially uniform thickness, it can be difficult to determine the original position within the block to which an individual slice corresponds. By analogy, when a loaf of uniform bread of substantially constant cross section is sliced into a multiplicity of parallel slices, most or all slices of the bread appear substantially identical, and reassembling the slices into their original order can be difficult unless each slice is captured as it is cut from the loaf and the order in which the slices are cut is carefully monitored. Similar difficulty attends microtome-slicing of a paraffin-embedded tissue sample, for example, and determining the original position and conformation of each slice within the paraffin block can be difficult if the order is not carefully monitored.

Difficulties in understanding positional correspondence between material in a sectioned block and the same material in the block prior to sectioning can arise from imprecision or unpredictability in techniques used to section the block. When a block having an embedded tissue sample is to be sectioned along a plane through the block, the actual plane of cutting may be displaced from its expected position (or an expected planar cut may actually not be made in a single plane) for a number of reasons, including imprecision in the sectioning apparatus, anomalies in sectioning operation (vibration or improper operator techniques), anomalies in block properties (e.g., discontinuities in block composition or in the properties of embedded tissues), or other reasons. In many instances, such as when a multiplicity of slices of substantially uniform thickness are being made, the precise location of sectioning corresponding to each slice is not critical, so long as the position of the resulting section in the original block can be reconstructed.

In each of these instances, it can be important to be able to derive—from information available in a section of the block—a relative location of the section within the block. The "relative" location of a section can be relative to a surface of the block prior to sectioning, relative to an adjacent section of the block, relative to a single 'reference' section, relative to an arbitrarily fixed marker within the original block, or relative to any other indicium that permits one who analyzes the section to identify its three-dimensional location within the block prior to sectioning (or, alternatively, to identify the three-dimensional location of a detectable portion of the section within the block prior to sectioning). That is, it can be important to be able to determine where—before the block was sectioned—a section or portion thereof originated within the block, either absolutely (i.e., relative to the boundaries of the block) or relatively (i.e., relative to a selected location on or within the block). It is to this task—relating the position of an item within a sectioned block to the position at which the item existed within the not-yet-sectioned block—to which the subject matter of this disclosure relates. The process of relating positions within block sections to pre-sectioning positions within the corresponding block is sometimes referred to as three-dimensional reconstruction of the sectioned block, in that performance of these techniques can permit visualization of the original position within the block of each section thus analyzed.

Three-dimensional reconstruction of a sectioned block containing a tissue sample can be performed by image-comparison methods, whereby image-to-image registration of two dimensional images of individual sections is used to reconstruct the block. However, such techniques exhibit significant shortcomings. Registration of adjacent images can often be accomplished only if the corresponding sections are similarly stained; this can be impossible if adjacent sections (i.e., which share a common tissue) are to be differently-stained or -treated. Three dimensional tissue reconstruction is also laborious and time-consuming. Furthermore, if a gap exists between two sections increases (e.g., one or more intervening sections is lost, differently stained, or simply exhibits a different tissue pattern), registration accuracy can decrease significantly.

Others have described methods of embedding materials within tissue-embedding blocks in order to permit three-dimensional reconstruction of the original blocks.

Bussolati et al. (2005, J. Cell. Mol. Med. 9(2):438-445), for example, disclose drilling holes in a block in which a tissue is embedded and embedding cores (obtained from a different, easily identified embedded tissue) into the resulting bore holes. Sectioning of the core-embedded blocks yielded slices at which the relative positions of the embedded cores could be detected. Bussolati describe embedding cores along non-parallel axes (see, e.g., Bussolati FIG. 2) in order to permit determination of the distance between serial sections of a single block.

Similarly, Shields et al. disclose (U.S. patent application 2006/0051736) insertion of detectable cylindrical cores into a block having a tissue sample embedded therein, the insertion occurring during or after the embedding operation. The cylindrical cores described by Shields include a detectable marker within them, and detection of the marker(s) corresponding to the inserted cores can be used for three-dimensional reconstruction of a block from which multiple sections are made.

A significant shortcoming of techniques described by others for embedding detectable cylindrical cores in embedded tissue sample blocks is their impracticality. The methods described in Bussolati involve drilling and insertion of cores into already-embedded tissue samples, and Shields describes similar methods. Shields also discloses simultaneous embedding of tissue samples and detectable cores. Even if these methods could be practically performed as a part of ordinary histological embedding and analytical techniques, these methods require complicated manipulations of tissue samples and cores which may well be beyond the abilities of ordinary histology laboratory workers. It would be beneficial if a technology were available to such workers for embedding fiducial markers in blocks in which tissue samples are embedded and if that technology did not require the complicated manipulations required by methods previously described by others.

Another significant shortcoming of known tissue-embedding and -sectioning techniques relates to establishment and confirmation of the identity of sectioned samples. Blocks in which biological samples are embedded frequently look nearly identical to one another, all the more so when the embedding materials and the molds used to form the blocks are the same. Furthermore, sections taken from such blocks tend to appear nearly identical to the naked eye, and can be difficult to differentiate from one another, even when examined microscopically or following staining or labeling operations. Currently, workers must be very careful to keep detailed records of the identities of blocks and sections and to label and segregate blocks and sections sufficiently to prevent confusion or mixing of samples. Furthermore, if labels or records or lost, it can be difficult or impossible to resolve blocks or tissue samples corresponding to those labels or records. These difficulties could be reduced or avoided by a technology that reliably and enduringly associated identifying information with blocks or sections (or, preferably, both).

The following disclosure relates to such technologies.

BRIEF SUMMARY OF THE DISCLOSURE

The invention relates to a mold for embedding a biological sample in a settable, sectionable medium. The mold includes at least a first sidewall and defines a cavity for containing the biological sample and the medium during an embedding process. The first sidewall has a cavity-side face that defines at least a portion of the cavity and that has fixed thereto a sectionable, detectable indicium. That indicium may extend into the cavity, remains fixed to the cavity-side face of the sidewall during the embedding process, and substantially retains its shape during the embedding process. Alternatively, the indicium may be embedded in the sectionable sidewall. When a block is formed by embedding the biological sample in the medium within the mold cavity, the block includes the indicium, which extends into the block and remain in the sectionable sidewall. The mold can, of course, have multiple sidewalls, and the indicia can be fixed to one or more of the sidewalls. In one embodiment, the base of the mold can be considered a first side wall.

In one embodiment, indicium is a differentiating indicium that permits multiple sections taken from a single block to be associated with that block and/or with one another. For example, the differentiating indicium can include one or more projected alphanumeric character extending away from the cavity-side face of the first sidewall (i.e., a column extending through the block that has the cross-sectional shape of the character(s)). Further by way of example, the differentiating indicium can include a plurality of projected rectangles extending away from the cavity-side face of the first sidewall, the projected rectangles being arranged parallel to one another in a row, so that a section taken through the indicia yields a machine-readable bar code (which can encode alphanumeric information). Multiple molds can be provided together as kits or sets, where no two molds within a kit or set includes the same differentiating indicia (i.e., blocks prepared using the molds will differ from, and be differentiable from, one another.

In another embodiment, the mold includes a fiducial indicium that has a shape that includes a plurality of differentiable, detectable bodies at known positions on the fiducial indicium, so that the position of a section of a block, relative to the original block, can be determined by assessing the detectable bodies in the section. By way of example, the fiducial indicium can have a shape that includes a multiplicity of differentiable, detectable bodies at known positions on the fiducial indicium, so that parallel planar sections that extend through the block and intercept the fiducial indicium can be unambiguously differentiated from one another. In such an embodiment, the pattern of detectable body positions on the fiducial indicium is preferably sufficiently complex that the relative positions of parallel planar sections that extend through the block and intercept the fiducial indicium can be unambiguously determined.

In the mold described herein, the indicia can be fixed directly to a mold sidewall or releasibly fixed to a sidewall (e.g., embedded in a sectionable medium that coats, abuts, or forms a sidewall. A mold may contain 1, 2, 3, 4 or more differentiable and/or fiducial indicia. An indicium can be configured to include features from a differentiable indicium and a fiducial indicium. Distinguishable features of an indicium include light absorption, fluorescence wavelength, shape, magnetism, and a combination thereof.

Also disclosed is a kit containing the mold of the present invention and a database. The database contains information on a distinguishable feature of the indicium. Distinguishable feature include light absorption, fluorescence wavelength, shape, magnetism, or any combination thereof. Multiple molds can be included in the kit. The database thus stores information on distinguishable features of an indicium matching planner sections and individual blocks.

The kit may further contain a scanner and a processing unit. The scanner is configured to detect the distinguishable feature of the indicium. The processing unit processes the detected distinguishable feature and identifies relative positions (e.g. orientation and depth) of sections and distinguish one block (or mold) from another. The processing unit and the processing unit can communicate with each other via any interface. In some embodiments, wireless communication is preferred. The kit may further contain a computer-readable non-transitory medium containing program instructions that can run on a computer and to operate a scanner to detect the distinguishable feature of the indicium, to send the detected distinguishable feature from the scanner to a processing unit, where the processing unit can identify relative positions of sections cutting through the indicium based on the detected distinguishable feature and information in the database. The scanner and the processing unit may be incorporated into a single unit which provides the above described detection and processing function. Of course, the same single unit may also contain the computer-readable non-transitory medium.

The disclosure also relates to a method for embedding a biological sample in a settable, sectionable block. The method includes depositing the biological sample within the cavity of the mold of the present invention and filling the cavity with an amount of a settable block-former to immerse at least a portion of the biological sample therein. Thereafter the block-former is subjected to conditions sufficient to induce it to set, yielding a set block having the biological sample embedded therein.

BRIEF SUMMARY OF THE SEVERAL VIEWS OF THE DRAWINGS

FIG. 6A is a diagram which illustrates the sidewall 32 of a mold resting upon a base 10 upon which a block of tissue-embedding medium can be formed. A fiducial indicium is embedded within the sidewall 32, and the sidewall is formed of a sectionable material.

FIG. 6B is a diagram which illustrates the sidewall 32 of a mold resting upon a base 10 upon which a block of tissue-embedding medium can be formed. A fiducial indicium 20 is releasibly fixed to the sidewall 32.

DETAILED DESCRIPTION

Figure 1:
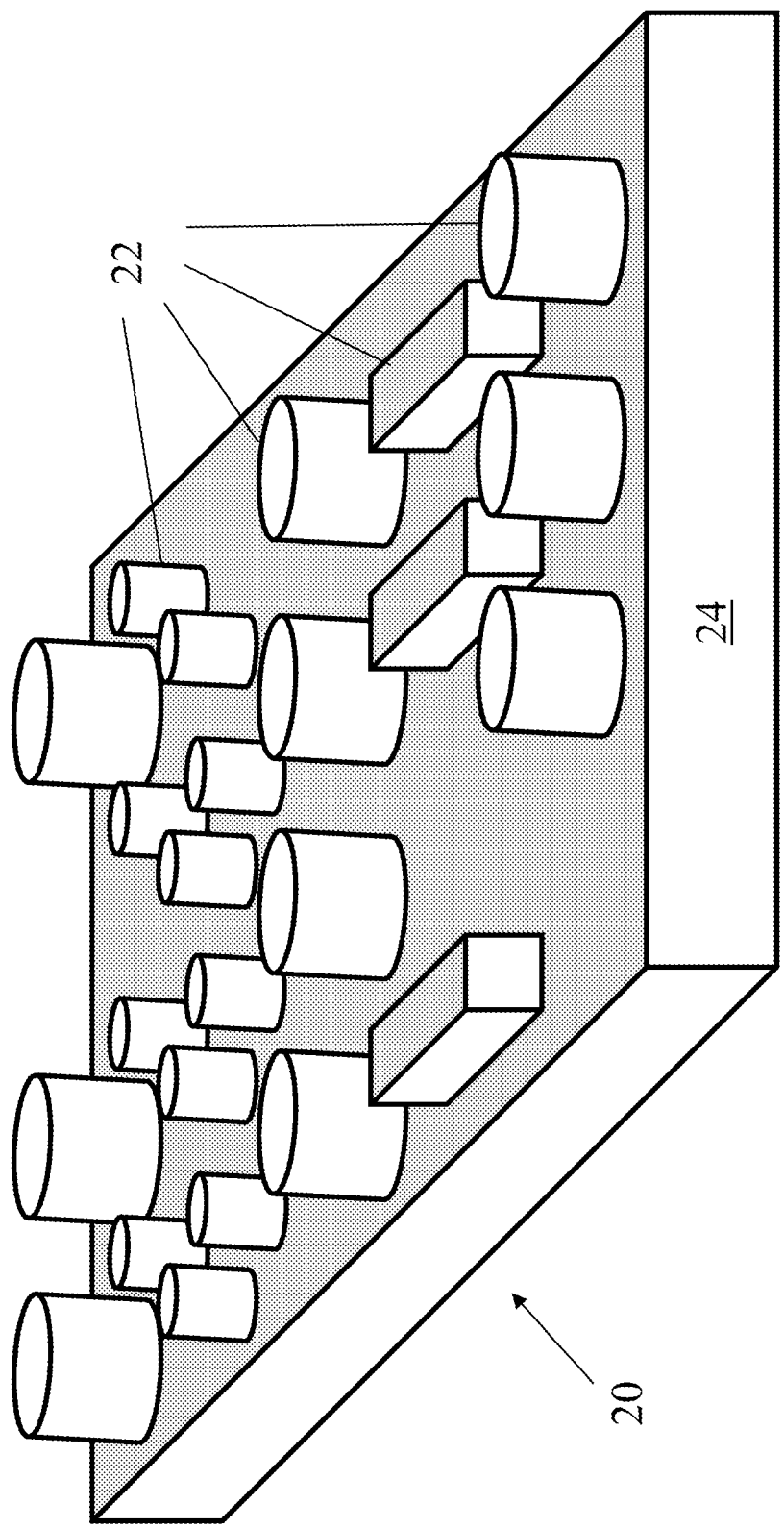
FIG. 1 is a diagram depicting an example of a fiducial indicium 20 described herein, including a flat portion 24 and several detectable bodies 22.

This disclosure relates to articles and methods for generating sectioned tissue samples. In particular, the disclosure pertains to articles and methods that can be used to determine the position, orientation, or both, of a section of a block within the block prior to its sectioning. The disclosure also relates to articles and methods that can be used to reliably and enduringly associate identifying information with blocks and sections taken from those blocks.

By way of example, a tissue sample can be embedded in a block of material (e.g., paraffin) and sections of the block can be prepared by cutting or shaving them (e.g., using a microtome) from the block. When multiple sections are prepared in this manner, it can be difficult to understand the original positions that the multiple sections occupied within the block prior to the block being sectioned. If the blocks and sections are physically separated from one another, it can be difficult to tell whether blocks or sections were previously associated with one another (e.g., whether each of several sections is a section taken from the same block).

The difficulty in determining whether blocks and sections were previously associated with one another is overcome in this disclosure by including at least one differentiating indicium within a block prior to sectioning it. A portion of the differentiating indicium will occur (e.g., at a known position) within every section taken through a block that intersects the differentiating indicium. Thus, multiple sections which include differentiating indicia encoding the same information can be prepared from a single block which include differentiating indicia encoding that information. By comparing the portions of differentiating indicia which occur in numerous sections, those sections taken from a common source block can be readily identified and sections taken from other source blocks can be distinguished.

The difficulty in understanding the original positions of multiple sections taken from the same block is overcome in this disclosure by including at least one sectionable fiducial indicium within the block prior to sectioning the block. The fiducial indicium includes at least one detectable body that can be detected in sections (e.g., slab-shaped slices) made from the block which include the body. The fiducial indicium preferably includes multiple detectable bodies which are distinguishable from one another (e.g., by shape, color, opacity, composition, or some combination of these) in sections made from a block in which they are embedded.

If the detectable bodies (or portions of them) that are detected in a section taken from a block unambiguously correspond to detectable bodies that occur at a specific portion of a fiducial indicium that was incorporated in the block prior to its sectioning, then the section (or at least the portion of the section including the detected detectable bodies) must correspond to the portion of the block at which that specific portion of the fiducial indicium was located prior to sectioning the block. In this way, including one or more fiducial indicia in a block permits one to identify one or both of i) the pre-sectioning position or depth (z coordinate) of the section within the block and ii) the pre-sectioning orientation (e.g. x-y coordinate) of the section within the block.

Fiducial indicia thus provide detectable portions within slices prepared from a block, the characteristics of the detectable portion of the slice corresponding with one or (less preferably) more portions of a fiducial indicium in the block prior to its sectioning. So long as the position and characteristics of the fiducial indicium in the block are fixed and recorded prior to sectioning, the position and/or orientation of any section of the block that includes a portion of the fiducial indicium can be determined, relative to the initial block. Even if the position and characteristics of the fiducial indicium in the block are not recorded prior to sectioning, the relative (to one another) positions and/or orientations of block sections can be determined for each section that includes an unambiguously identifiable portion of the fiducial indicium.

In one embodiment of the subject matter disclosed herein, fiducial indicia are incorporated into an embedded tissue sample block at known absolute or relative positions, so that absolute or relative positions and/or orientations of sections taken from the block can be determined.

Figure 4:
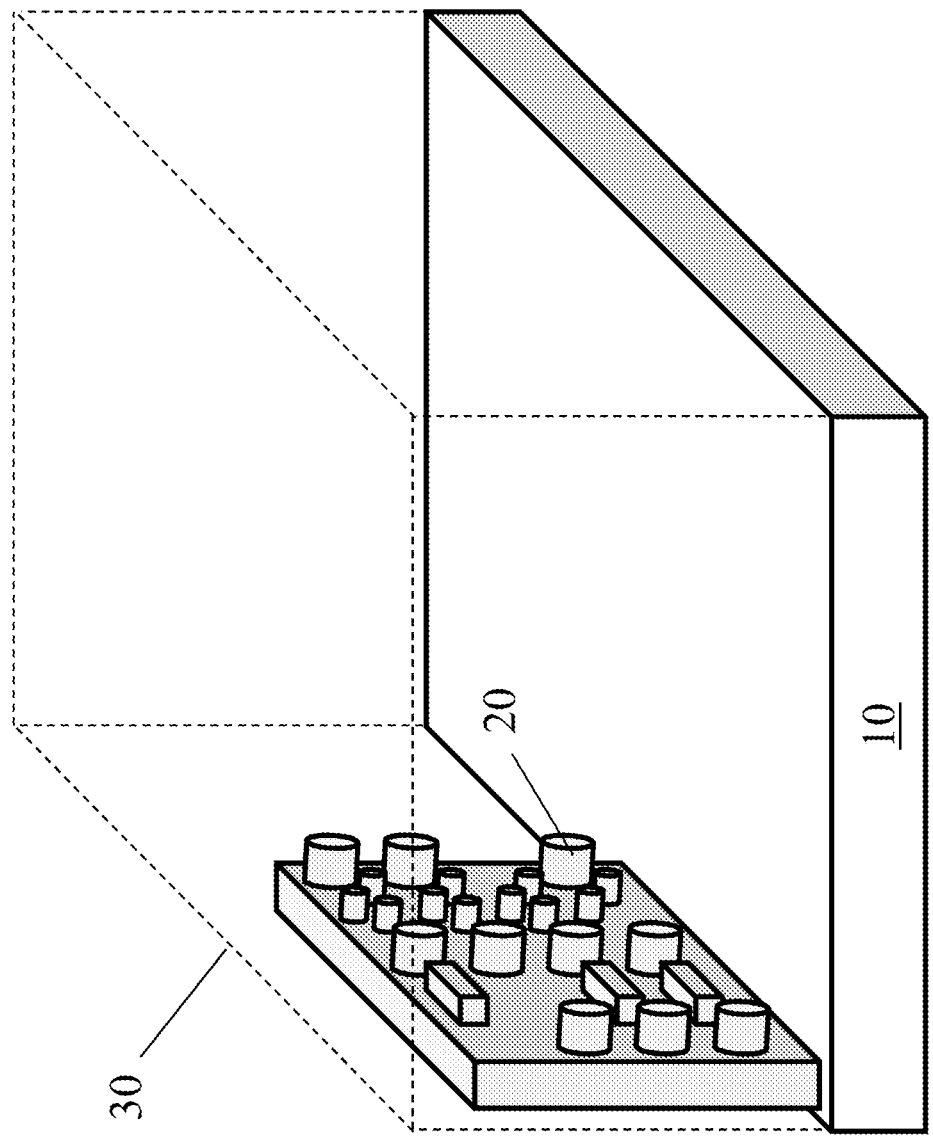
FIG. 4 is a diagram which depicts a fiducial indicium 20 resting upon a base 10 upon which a block of tissue-embedding medium 30 has be formed, the block 30 incorporating the fiducial indicium 20.

By way of example, with reference to FIG. 4, a fiducial indicium 20 can be positioned within a block 30 of a medium by positioning the fiducial indicium 20 on a base 10 at a defined position and forming the block 30 around the fiducial indicium 20. If the fiducial indicium 20 includes multiple detectable bodies upon it in a conformation or arrangement that yields a distinct profile for sections of the block 30 that are made parallel to the face of base 10, then each such section can be unambiguously identified, so long as the section includes the portion of the fiducial indicium 20 corresponding to the distance of the section from the base 10. Even if the absolute position of the fiducial indicium 20 in FIG. 4 were not known, sections taken through the block 30 (whether or not those sections are taken parallel to base 10) which include a portion of the fiducial indicium 20 can be positionally related to one another (i.e., their pre-sectioning positions can be determined relative to one another), so long as each such section includes an unambiguously identifiable portion of the fiducial indicium 20.

Figure 8:
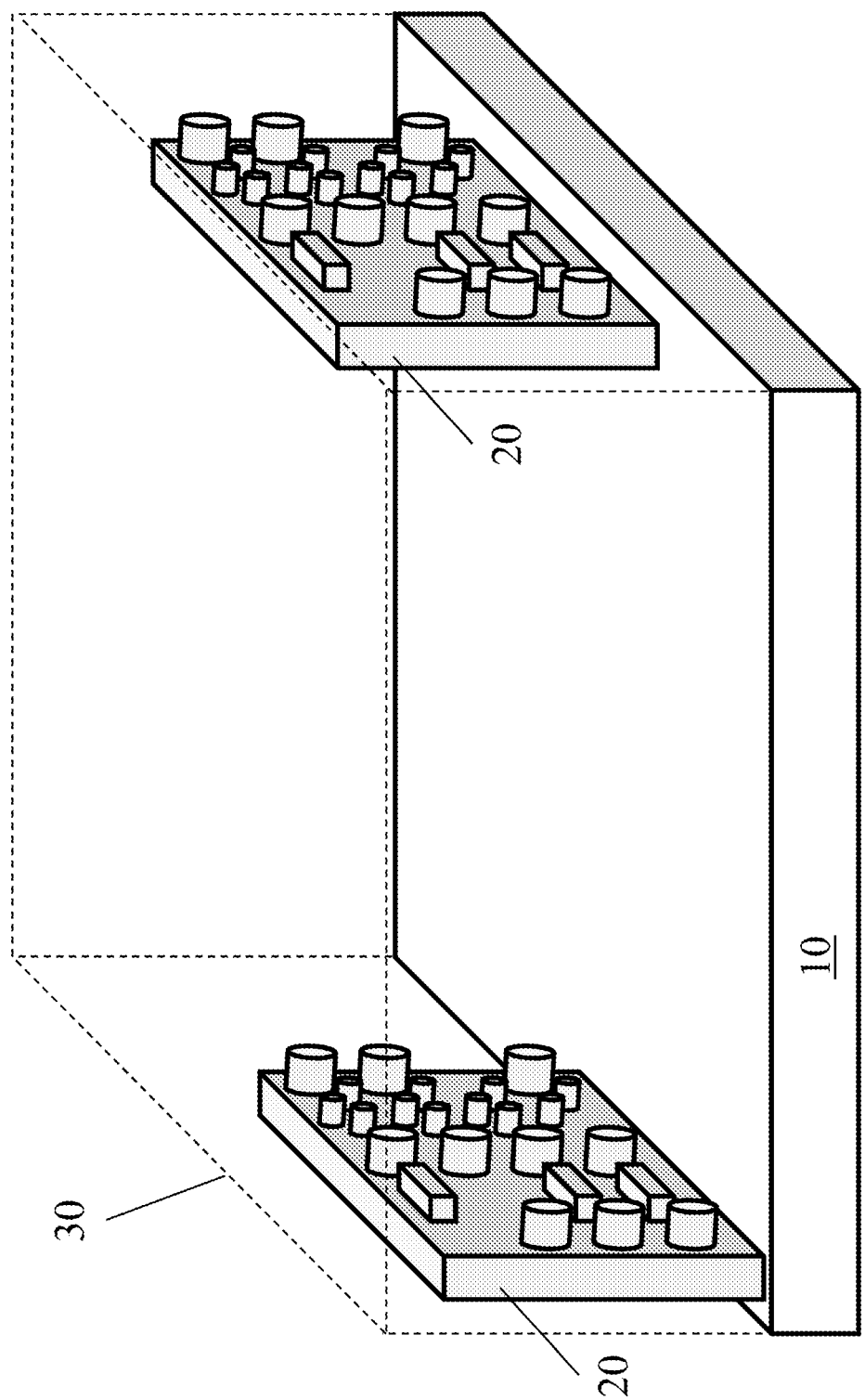
FIG. 8 is a diagram which depicts a pair of fiducial indicia 20 resting upon a base 10 upon which a block of tissue-embedding medium 30 has been formed, the block 30 incorporating the fiducial indicia 20 which, in this example, have substantially the same shape and orientation, and occur at distinct locations within the block 30.

When a block includes multiple distinguishable fiducial indicia, the orientation of sections taken through two or more of the indicia can be determined, so long as the sections intersect multiple indicia. By way of example, FIG. 8 illustrates a block 30 in which two fiducial indicia 20 are embedded, each positioned against the surface of base 10 and having detectable bodies thereon at known distances and patterns from base 10. The two indicia can be distinguished from one another owing to their different orientations (detectable bodies extending toward the center of the block for the indicium on the left in FIG. 8 and extending toward the edge of the block for the indicium on the right). The indicia 20 could also be distinguished, for example, by forming them of different-colored materials. Any section of block 30 that extends through and includes unambiguously-identifiable portions of both indicia can be 'mapped' to positions on both indicia, and the distance from the surface of block 30 defined by block 10 of the portions of the section including the indicia can be determined. This process can be used to determine both the position and orientation of the section, relative to the original block.

A differentiating indicium serves as an identifier of sections from a particular block. The differentiating indicium includes one or more detectable bodies which are distinguishable from block to block in terms of shape, color, opacity, composition, or any combination of thereof.

Figure 13:
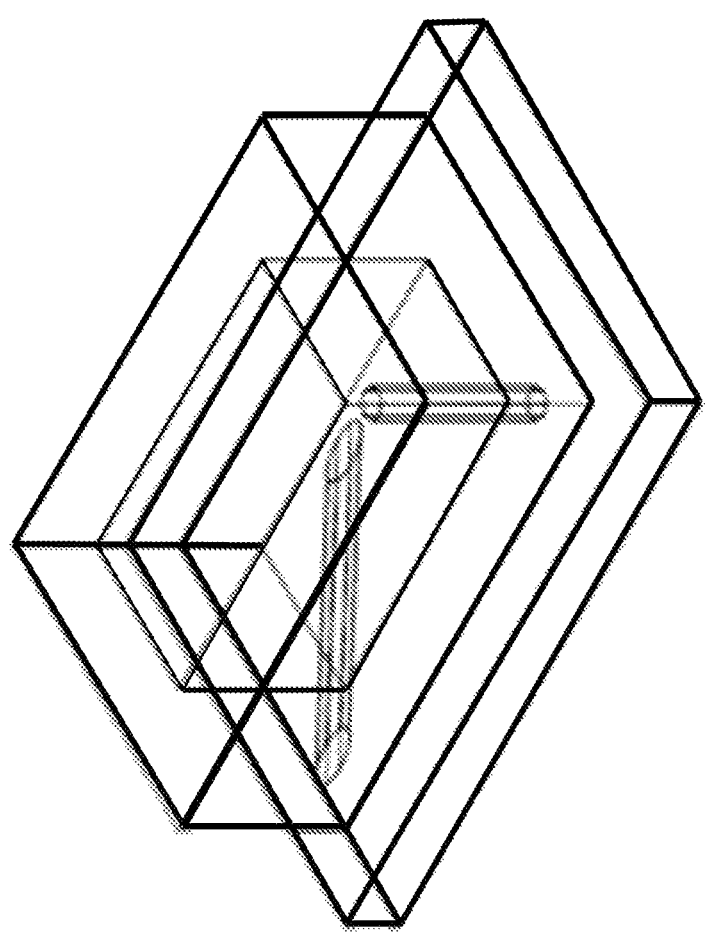
FIG. 13 is a diagram depicting an indicium containing a diagonally placed rod and a second rod, which defines the orientation and position of a section. The distance between the cut-through points is unique to a particular section.

In some embodiments, a detectable body in a fiducial indicium and/or a differentiating indicium is a shape, which include for example, a polygon (with 3, 4, 5, 6 or more sides), a hole, a cube, a rectangle, a line, a bar, a cylinder, a circle and a combination of these. These shapes contain one, two, three or more reference points or markers for determining the orientation, position and source of the section. In some embodiments, the distance between the two, three or more reference points or markers are specific to the orientation and position of a section and its block source. For instance, a section cutting through the top of a circle shows the corresponding portions of the circle at a short distance. Meanwhile, a section cutting through the middle of a circle features two corresponding portions further distanced away from each other. Even if the circle has an irregular shape, as long as the pre-sectioning pattern of the circle is pre-determined or recorded (e.g. in a computer), the position and orientation of a section can be readily identified. Similarly, a diagonally placed rod will register a specific location at different depths. The single rod also identifies a particular block if other blocks contain two or more rods or a different shape. In some embodiments, the distance between two bars or rectangles or two reference points thereon is a distinguishing feature between sections and between blocks. For instance, a diagnostically placed rod, together with a second rod in certain angle, provides information on the orientation and position of a section as shown in FIG. 13. Because each section correlates to a particular distance between the cut-through points (or reference points) of the two rods, the orientation and position of the section can be readily determined by measuring the distance between the two reference points. When a third rod is placed parallel to one of the above rods, the two parallel rods with a pre-determined distance serve as an identifier of a block. Each rod may independently have any shape such as a round column or a multi-faceted column.

Figure 14:
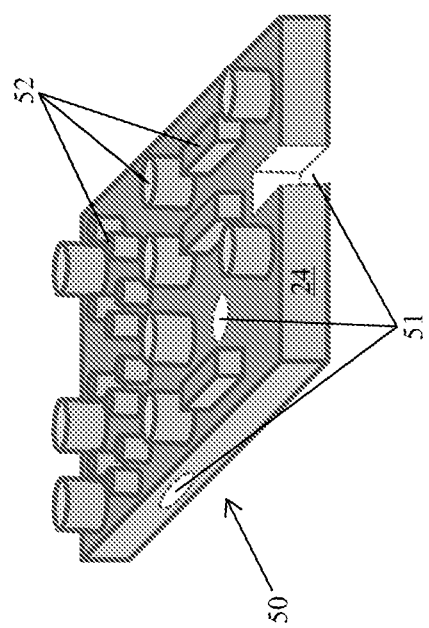
FIG. 14 is a diagram depicting an indicium 50 containing both positive features and negative features. Detectable bodies 51 are negative features. Detectable bodies 52 are positive features.

A shape for a fiducial indicium and/or a differentiating indicium can be a positive feature or a negative feature. For purpose of illustration, a rectangle, a circle, or a triangle sticking out of a surface present a positive feature, whereas the same shape going into a surface is a negative feature. Another example of a negative feature is a hole, a concave, or a void space in the indicia. For instance, the negative feature of a hole can be created when a removable metal rod is embedded and encapsulated in agarose gel and is then taken out. An indicium may contain 1 or more positive features, negative features, and any combination of these. FIG. 14 illustrates an indicium containing both positive features (52) and negative features (51). The shape of the void space for the negative feature includes, for example, a rectangle, a cube, a column, an oval and a ball. In some embodiments, an indicium of the present invention contains only negative features. In some embodiments, an indicium of the present invention contains only positive features. In some embodiments, at least one of the sidewalls is compatible to attach directly to a sectioning device.

Various technologies known in the art can be used for sectioning. For example, cryosectioning using cryo-mounting medium for frozen sections can be readily adopted to the present invention. Other procedures include those disclosed in US Pat. App. Nos. 20130316365 and 20100323907, the entire disclosure of which is hereby incorporated by reference.

Fiducial Indicia

One or more fiducial indicia can be embedded within an embedded-tissue sample block in order to facilitate correlation of occurrence of a portion of one or more of the fiducial indicia within a section cut from the block with that section's original position and/or orientation within the block. Fiducial indicia thus have a function that can be characterized alternatively as 'mapping,' virtual reconstruction, correlating function. In keeping with this function, a fiducial indicium must exhibit two properties: it must be detectable in a section which includes a portion of the indicium therein and its detectable characteristics must be correlatable with the position and/or orientation of the indicium in the block prior to sectioning.

These characteristics can be satisfied if the fiducial indicium includes at least one detectable body, and can be more robustly satisfied if the fiducial indicium includes multiple detectable bodies. If the detectable characteristics (e.g., shape, color, thickness, or number) of those detectable bodies differ at different portions of the fiducial indicium, then occurrence of the differing detectable bodies in different sections taken from the block can be used to correlate the original spatial position and orientation of those sections, so long as the original arrangement of the differing detectable bodies within or along the fiducial indicium is known.

By way of example, a fiducial indicium having the shape of a rectangular slab with a single notch and a pair of bumps spaced apart from each other by a known distance on the same face of the slab can be embedded within a block, together with a tissue sample. The block can be sectioned to yield a first section in which a portion of the fiducial indicium including the notch is embedded and a second section in which a portion of the fiducial indicium including the bumps. Because the original orientation (i.e., both on the same face of the slab) and separation (i.e., the known distance) of the notch and the bumps is known, the original position and orientation within the block of the first and second sections can be determined by analyzing the position and orientation of the two portions of the fiducial indicium embedded therein. This is so even if there are other sections of the block (not including the notch or bumps) which were originally interposed between the first and second sections in the block. If the position of the fiducial indicium in the block, prior to its sectioning, was known (i.e., the notch and bumps occurred at defined positions within the block), then the positions of the first and second sections can be determined relative to those positions. Thus, even a relatively simply-structured fiducial indicium can be used to understand the origin (within a block) of sections taken from that block.

As illustrated in FIG. 1, a fiducial indicium can have a relatively complicated structure or shape, and this complexity can assist one to identify portions of the fiducial indicium that are embedded within a block section. In FIG. 1, the fiducial indicium 20 has the shape of a rectangular slab having rectangular blocks and cylinders (each a detectable body 22, as can be the rectangular slab 24 itself) protruding from one face at known positions. Sections taken through the fiducial indicium can have a unique profile, depending on which of the projecting detectable bodies 22 are intersected by the section surface. Furthermore, because observation of portions of the fiducial indicium 20 that flank the section surface can unambiguously identify the position of the section surface within the indicium. Similarly, multiple sections through the fiducial indicium 20 illustrated in FIG. 1 will be separately identifiable and 'mappable' to their respective positions and orientations on the pre-sectioning indicium. In some embodiments, the fiducial indicium contain multiple squares and/or rectangles, which are of different size and arranged parallel to the direction of section cutting. The relative position including depth and orientation of each section can thus be matched to the shape and size of the square and/or rectangles on the section.

The positions and/or orientations of two or more sections which include identifiable portions of a single fiducial indicium can be related to one another by relating the position and orientation of each section to the fiducial indicium. Similarly, if those sections include identifiable portions of multiple, distinguishable fiducial indicia (e.g., a blue one and a red one), then this positional/orientation correlation can be verified (for sections which include portions of multiple fiducial indicia) or extrapolated (e.g., if, in three serial sections of a block, the first and second sections each include portions of a blue indicium and the second and third sections of the block each include portions of a red indicium). Inclusion of multiple fiducial indicia in a block also can increase the likelihood that sections of the block will include a portion of at least one indicium and can decrease the likelihood that aberrations in sectioning (e.g., detachment from a section of a part including a portion of an indicium) will defeat positional/orientation correlation.

Fiducial indicia can be embedded within a block in a variety of ways. For example, a fiducial indicium can be positioned on or within a mold used to form a block prior to forming the block or during its formation. A fiducial indicium can also be applied to (e.g., embedded in a material attached to or molded around) a block after its formation. Prior methods (e.g., those of Bussolati et al.) for inserting fiducial indicia into an embedded tissue block require removal of material from the block and replacement of that material with the indicia or a medium containing the indicia. These manipulations can be difficult or impossible to achieve with indicia which include multiple identifiable portions having a known orientation to one another. By contrast, the fiducial indicia described herein and the methods of incorporating them into an embedded tissue block do not suffer this shortcoming. Using the materials and methods described herein, indicia which have relatively complicated shapes, conformations, relative positions, or orientations can be incorporated into tissue blocks without altering these characteristics.

A common way of forming blocks, such as those having a tissue sample embedded within them is to assemble a mold, fill it with a settable medium, induce or allow setting of that medium within the mold, and remove the mold to yield the block. By way of example, it is common to prepare tissue samples for sectioning by replacing water in the tissue sample with a settable medium such as paraffin, suspending the tissue sample in a molten paraffin, and pouring the molten paraffin (including the tissue sample) into a mold. After the paraffin cools and hardens, the mold is removed to yield a paraffin block having the tissue sample embedded therein. The block can thereafter be sectioned (e.g., by shaving serial sections from the block using an instrument such as a microtome). The fiducial indicia described herein can be incorporated into such a block at substantially any step of this process. However, it can be preferable to position one or more fiducial indicia about the space in which such a block will be molded (i.e., so that those indicia will become part of, and have fixed positions relative to, the block once it is formed).

As illustrated in the figures included herewith, one (see FIG. 2) or more (see FIG. 3) fiducial indicia 20 can be positioned on a base 10. This assembly can be surrounded with a mold (not shown in the figures) and a block 30 of sectionable medium can be formed which completely or partially embeds the indicia 20 therein (compare FIGS. 2 and 4; see also FIGS. 8 and 9). A tissue sample TS can also be embedded in the block 30 (see, e.g., FIGS. 5 and 9). As shown, for example, in FIG. 4, a fiducial indicium 20 can be embedded such that its relative or absolute position is known (in FIG. 4, for example, the broad flat face of indicium 20 is substantially flush with one face of the block 30).

Figure 7:
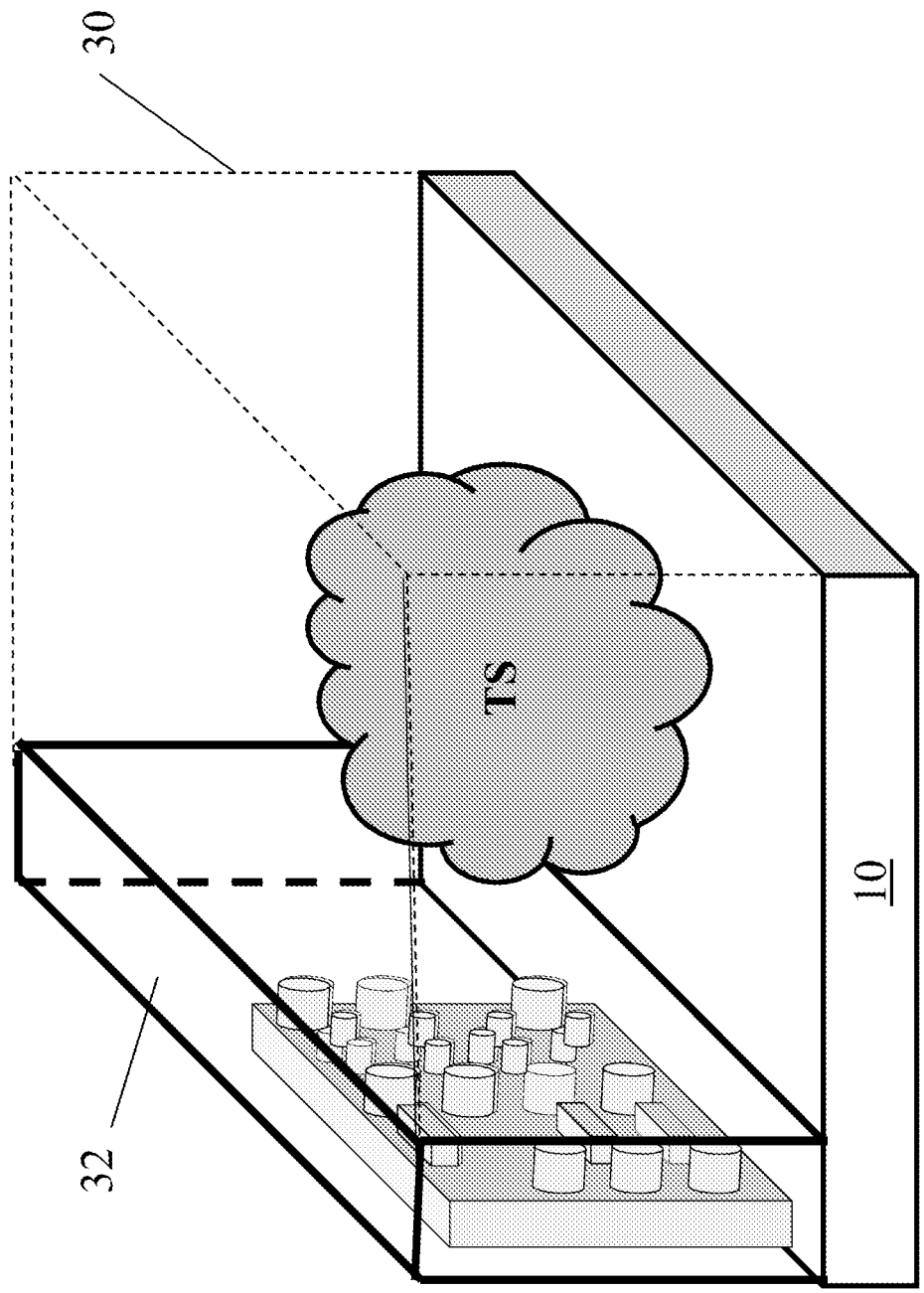
FIG. 7 is the assembly shown in FIG. 6A, with the addition that a block of tissue-embedding medium 30 in which a tissue sample TS has been embedded has been formed upon the base 10. Because both the sidewall 32 and block 10 are sectionable, a portion of the fiducial indicium embedded in the sidewall 32 can be included in a section taken through the fiducial indicium, the sidewall 32, and the tissue sample TS.
Figure 9:
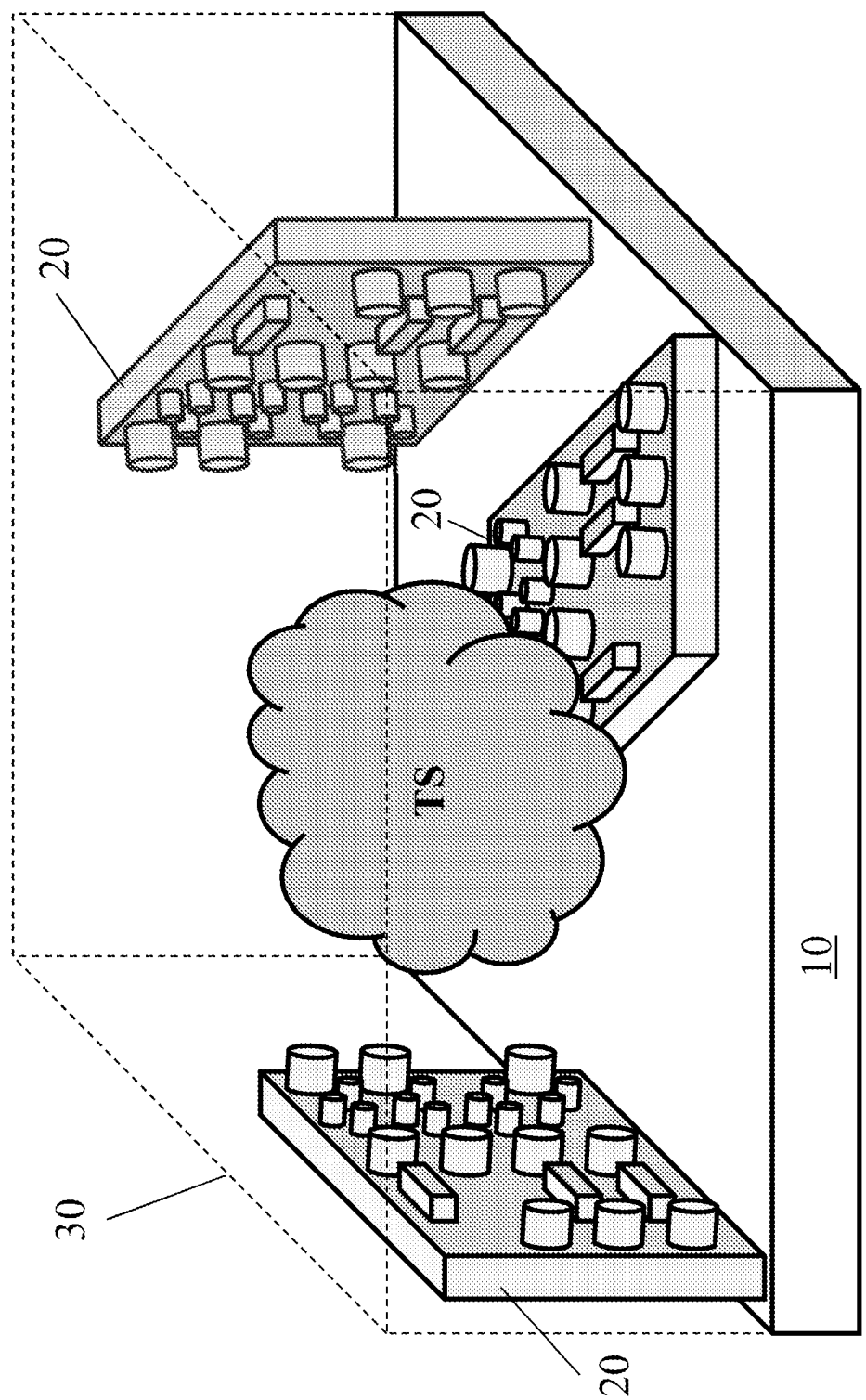
FIG. 9 is a diagram which depicts three fiducial indicia 20 resting upon a base 10 upon which a block of tissue-embedding medium 30 has be formed and a tissue sample TS has been embedded in the block 30. The block 30 incorporates the three fiducial indicia 20 which, in this example, have substantially the same shape but distinct orientations, and occur at distinct locations within the block 30.

In an important embodiment illustrated in FIGS. 6A, 6B, and 7, a fiducial indicium can be embedded in (FIGS. 6A and 7) or positioned flush against the inner surface of a sidewall 32 of a mold used to contain a settable medium during formation of the block 30. In these embodiments, the mold sidewall 32 can be made from a material that bonds or adheres to (or is identical to) the settable medium and that can be sectioned using the same technique used to section the molded block 30. Importantly, fixing or selecting a position for the fiducial indicium 20 within or having a known relationship to the sidewall 32 permits precise location of the indicium 20 relative to the block 30, permitting the position and/or orientation of sections of the block to be related to the position/orientation of the sidewall 32, the base 10, or both. Such an assembly can be used to unambiguously determine the original positions within the block 30 of sections taken therein. Fiducial indicia 20 can be positioned within or relative to more than one sidewall 32 of a mold use to define the shape of a block 30, including the base 10 (as shown in FIG. 9).

In an embodiment illustrated in each of FIGS. 2-9, one or more fiducial indicia 20 extend over substantially the entire height (in FIGS. 2-9, the distance in the direction away from and perpendicular to the planar face of base 10) of the block 30. Thus, for blocks for which sections are taken substantially parallel to the base 10, portions of one or more fiducial indicia 20 should occur in substantially every section, permitting unambiguous virtual reconstruction of the entire stack of sections (i.e., enabling one to determine the initial position within the block of each section).

The material(s) from which the fiducial indicia are made are not critical, except that i) those materials should be sufficiently resistant to softening or destruction during block formation that their shape and size are preserved during that process and ii) those materials should be sectionable using techniques for sectioning the block. The materials (or another material in which the indicia are embedded) should also exhibit sufficient compatibility with the settable medium used to form the block that the indicia will form a cohesive or integral solid phase with the block material during and after setting of the block material. This cohesion/integrity inhibits detachment of the fiducial indicia from the block during and after sectioning.

The methods used to form the differentiating and fiducial indicia described herein can be the same or different, and the identity of those methods is not critical. The indicia can be preformed or formed during tissue fixation or embedding operations. The indicia can be similarly fixed to one or more sidewalls of a mold by substantially any known technology.

In a preferred technique (illustrated in FIGS. 2, 4, 5, and 10 for example), differentiating indicia, fiducial indicia, or both, can be formed directly upon a surface of the cavity portion of a mold prior to embedding a biological sample (one or more cells or tissues) in a settable, sectionable medium within that cavity. In this way, the pre-formed indicia can be included together with the biological sample in the block formed within the cavity when the medium is set. For example, the indicia can be formed upon a base (e.g., a coated or non-coated glass slide) that is used as a sidewall to define a cavity within a mold, the indicia extending away from the base into the cavity.

In another preferred technique (illustrated in FIGS. 6A and 12 for example), indicia are formed within a sectionable medium (e.g. paraffin) that coats, covers, or abuts against a portion of a mold sidewall (i.e., on its cavity-side face). When a biological sample is embedded in a settable, sectionable medium within that cavity, the indicia are included in the block so formed.

The technique used to make indicia (whether fiducial or differential indicia) is not critical, and substantially any known technique can be used. Examples of techniques known for forming indicia include molding of settable materials (e.g., a mixture of two or more of agarose, gelatin, acrylamide gel, and paraffin) into the desired shape, molding of settable materials into a precursor shape followed by cutting, drilling, or other machining operations performed upon the precursor shape, and three-dimensional printing.

By way of example, biological tissue samples are frequently embedded in paraffin-based materials, which liquefy when heated above a defined transition temperature and solidify when cooled below that temperature. Fiducial indicia to be embedded in paraffin-based blocks should not significantly soften or melt at a temperature below the paraffin transition temperature, and preferably soften or melt only at a significantly higher temperature than the maximum temperature to which molten paraffin-based materials will be heated during block formation. For example, to encourage cohesion between indicia and paraffin-based block materials, the fiducial indicia can be formed from a mixture of agarose and paraffin (the agarose neither melting or softening at temperatures used to mold the block material); even if paraffin within such an indicium melts during embedding of the indicium into the block material, the agarose will retain the size and shape of the indicium during this process. Similarly, fiducial indicia that are fixed to a mold base or sidewall prior to filling the mold with molten paraffin can be made from a gelled mixture of agarose and gelatin (i.e., components which can retain their shape at the temperature of molten paraffin), the agarose-gelatin gel being infused with paraffin. When such an indicium contacts molten paraffin, paraffin infused within the gel can melt and mix with molten paraffin with which the mold has been filled; this can promote inclusion of the indicium and the paraffin into an integral block, thereby reducing the likelihood that the indicium and the paraffin matrix will separate from one another during sectioning or other operations.

Further by way of example, stiffer materials such as acrylics and epoxys are used to form blocks for very thin sectioning of tissue samples. Fiducial indicia embedded in or against blocks formed by setting such materials should resist deformation or disintegration under the conditions of setting.

In embodiments in which one or more fiducial indicia are intended to maintain a fixed relationship to a mold boundary (e.g., a mold base or one or more sidewalls of a mold), it is important that the bond between a fiducial indicium and the mold boundary be unaffected by anticipated processing steps such as mold-surface-coating processes, tissue-fixing steps, tissue-dehydrating, -clearing, and -paraffin-infusing steps. The bond between fiducial indicia and mold boundaries (e.g., sidewalls) that will be removed from a molded block prior to sectioning should be severable (e.g., by cutting with a blade or by peeling). Selection of materials and reagents for effecting bonding of fiducial indicia to mold boundaries depend on the identities of the materials which the mold boundaries and fiducial indicia are constructed; their selection is within the ken of an ordinarily skilled artisan in this field. In an important embodiment, fiducial indicia are bonded to a base portion of a mold sufficiently resiliently that the indicia remain bound thereto throughout tissue-embedding and -sectioning steps.

Figure 5:
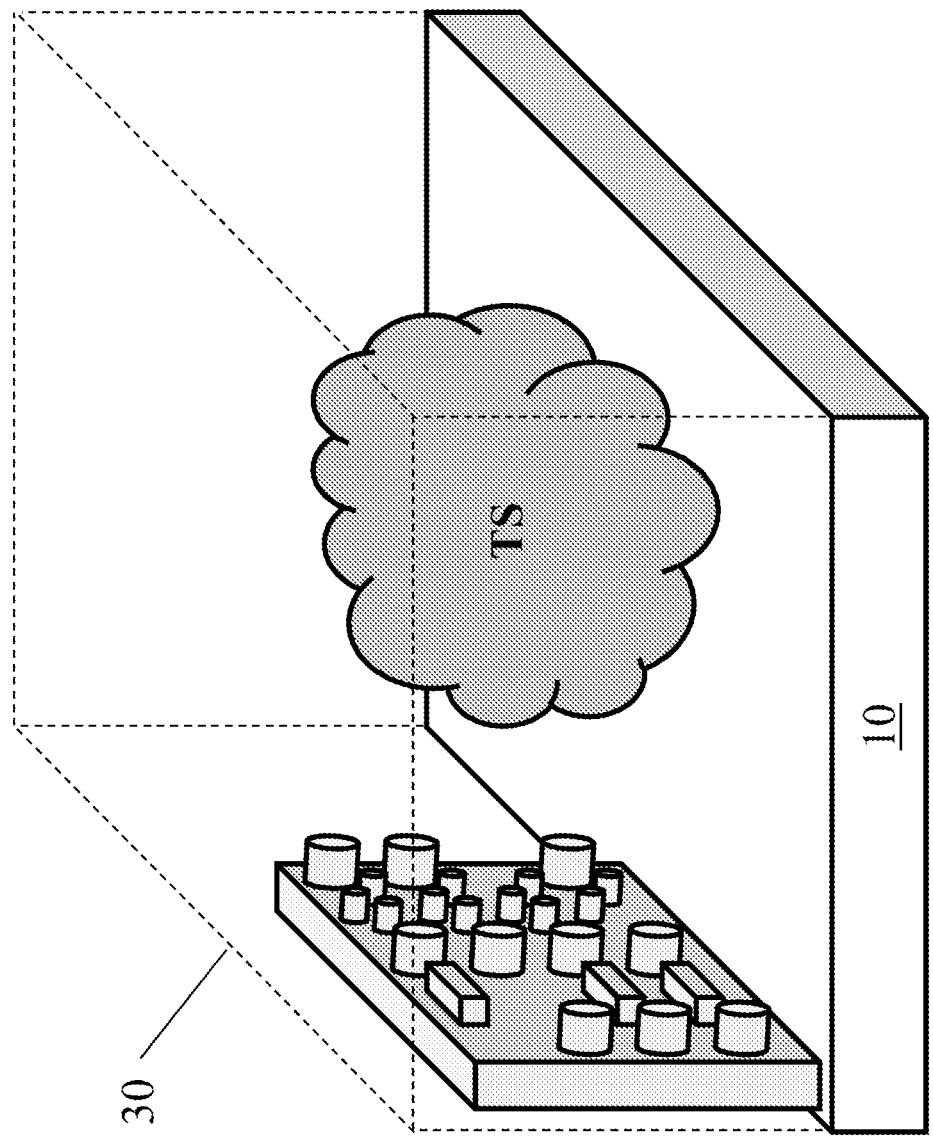
FIG. 5 is a diagram which illustrates a tissue sample TS embedded within the block 30 in the assembly depicted in FIG. 4.

By way of example, in FIG. 5, the fiducial indicium can be essentially irreversibly bound to base 10 such that it remains in a fixed position relative to the base during processing of tissue sample TS upon the base and formation of block 30 about the tissue sample and fiducial indicium. In this example, at least some sections prepared by slicing block 30 along planes substantially parallel to the surface of base 10 will include portions of both tissue sample TS and the fiducial indicium. Positions within a section of tissue sample TS can be related to the surface of base 10 by detecting the corresponding portions of the fiducial indicium that occur in the section. Thus, in this example, the height of various sections above the base 10 can be determined and permit relative positioning and orienting of portions of the tissue sample TS that occur within such sections. In this way, characteristics of the tissue sample TS can be determined in three dimensions.

A skilled artisan in this field recognizes that a wide variety of materials can be used to form the blocks and the fiducial indicia described herein, consistent with the properties and requirements described herein. Although certain materials have been described as suitable examples, the concepts described herein are not presently believed to be dependent upon the precise materials selected to make these elements.

Similarly, the method(s) by which fiducial indicia described herein are formed is not critical. It can be preferable that at least a portion of a fiducial indicium include a relatively 'complex' pattern of detectable bodies, such as a complicated shape, pattern of color or opacity, or other detectable characteristic. A wide variety of techniques are known in the art for generating suitable fiducial indicia. By way of example, for fiducial indicia having a complicated shape on at least a portion of an indicium, techniques such as molding, micromachining, and three-dimensional printing can be used to form such indicia.

Fiducial indicia can be positioned randomly, semi-randomly, or at defined positions relative to the block.

In a simple method of randomly positioning indicia within the block, pre-formed fiducial indicia are simply mixed with a settable medium (e.g., before, after, or during combination of that medium with a tissue sample), and the medium is permitted to set. If the indicia are substantially denser than the medium and the medium sets relatively slowly, the indicia can be expected to settle to the bottom of the mold in which the medium is contained while it sets. If the medium sets relatively quickly, if the indicia have substantially the same density as the medium, or both, the indicia can be expected to remain suspended throughout the set medium.

In a semi-random method of positioning fiducial indicia relative to the block, a 'frame' or mold can be formed from a settable material in which pre-formed fiducial indicia are mixed or suspended, leaving a void within the frame/mold in which the block can later be formed. The frame/mold material is permitted to set, fixing the positions of the indicia randomly about the void, and the block is thereafter formed from the same or another settable medium within the void. The resulting assembly includes a set block having the set frame/mold material (containing the indicia) fixed at one or more sides of the block.

In a method illustrated, for example at FIGS. 6A and 6B, a fiducial indicium 20 can be positioned within (FIG. 6A) or adjacent (FIG. 6B) a sidewall 32 of a mold at a pre-selected position, and the block 30 is thereafter formed against the interior of the sidewall 32 (as illustrated in FIG. 7, corresponding to FIG. 6A). Because the position of the fiducial indicium 20 is known, relative positions of materials (e.g., portions tissue sample TS in FIG. 7) within the block can be determined by comparison of the positions of those material within sections taken from the block with the positions of portions of the fiducial indicium 20 that occurs within the same section.

Differentiating Indicia

One or more differentiating indicia can be embedded within an embedded-tissue sample block in order to facilitate identification of sections taken from the block as corresponding to the block. Differentiating indicia thus have alternative functions that can be characterized as identifying the source of a section and differentiating sections taken from different blocks. In keeping with this function, a fiducial indicium must exhibit two properties: it must be detectable in a section which includes a portion of the indicium therein and its detectable characteristics must encode identifying information sufficient to identify the block from which the section was taken.

Indicia embedded within an embedded-tissue sample block can function both as fiducial indicia and as differentiating indicia, so long as those indicia satisfy the characteristics for each that are disclosed herein.

Preferably, most or all sections taken from a single block will include the same differentiating indicia. So long as the direction in which sequential sections will be taken from a single block is known, this can be achieved by applying or constructing the differentiating indicia as one or more columnar structures, such that a section taken through the columnar structure(s) will include in each section a portion having the same shape or conformation in each of the sections. By way of example, a columnar structure having the form of a circular cylinder extending through the block perpendicularly to the plane of sectioning will appear as a filled circle or circular disk in each section. Likewise, a columnar structure having the form of a cubical solid will appear as a filled square or square-cross-sectioned block in each section. Further by way of example, a columnar structure shaped like a vertical projection of the letter 'O' (i.e., having the shape of a circular cylinder having a circular cylindrical hole therein) will appear as the letter 'O' (i.e. a circle or annulus) or an annular cylinder in each section. Thus, substantially any information that can be encoded in a columnar structure can be embedded in one or more differentiating indicia in an embedded tissue block, and sections taken through the block (intersecting, preferably perpendicularly, the aligned axes of those columnar structures) will yield sections of the block that exhibit the encoded information.

The manner in which identifying information is encoded within a differentiating indicium is not critical. Differentiating indicia can take the form of alphanumeric characters (e.g., single characters, words, multi-digit numbers, or collections of random characters), spots or dots, line segments, bars, or arrays of two or more of these. In a preferred embodiment, the information is encoded in a manner that the information can be detected and interpreted by a machine in sections taken from the block. By way of example (illustrated in FIGS. 10-12), information can be encoded in the form of a linear array detectable rectangular columns which extend through a block. Sectioning the block yields sections which include a linear array of portions of each column. Viewed along the columnar axis, a section taken perpendicular to that columnar axis will appear to include a linear array of stripes, and such stripes can be read (e.g., as a bar code) using known machine-reading technology. Similarly, arrays of dots (or other circles), letters, numbers, or combinations of these can be read using known machine-reading technology.

Figure 10:
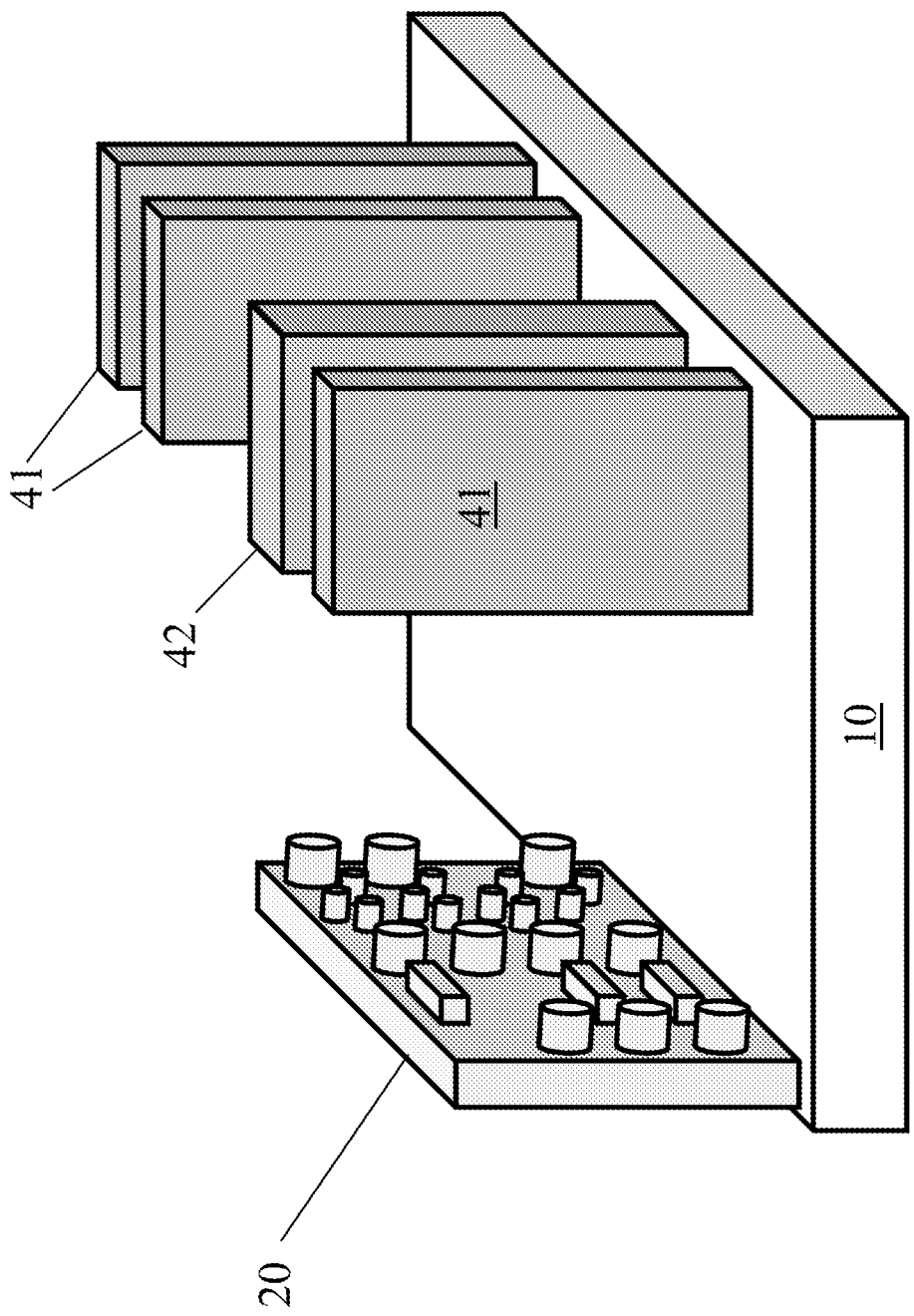
FIG. 10 is a diagram which depicts a fiducial indicium 20 fixed to a base 10 to which three narrow differentiating indicia 41 and one broad differentiating indicium 42 have also been fixed. The differentiating indicia 41 and 42 have been disposed parallel to one another in a row so that sections taken parallel to the surface of the base 10 of a tissue-embedding medium formed upon the base 10 will include sections of the differentiating indicia 41 and 42 that appear in the section in a machine-readable bar code form.
Figure 12:
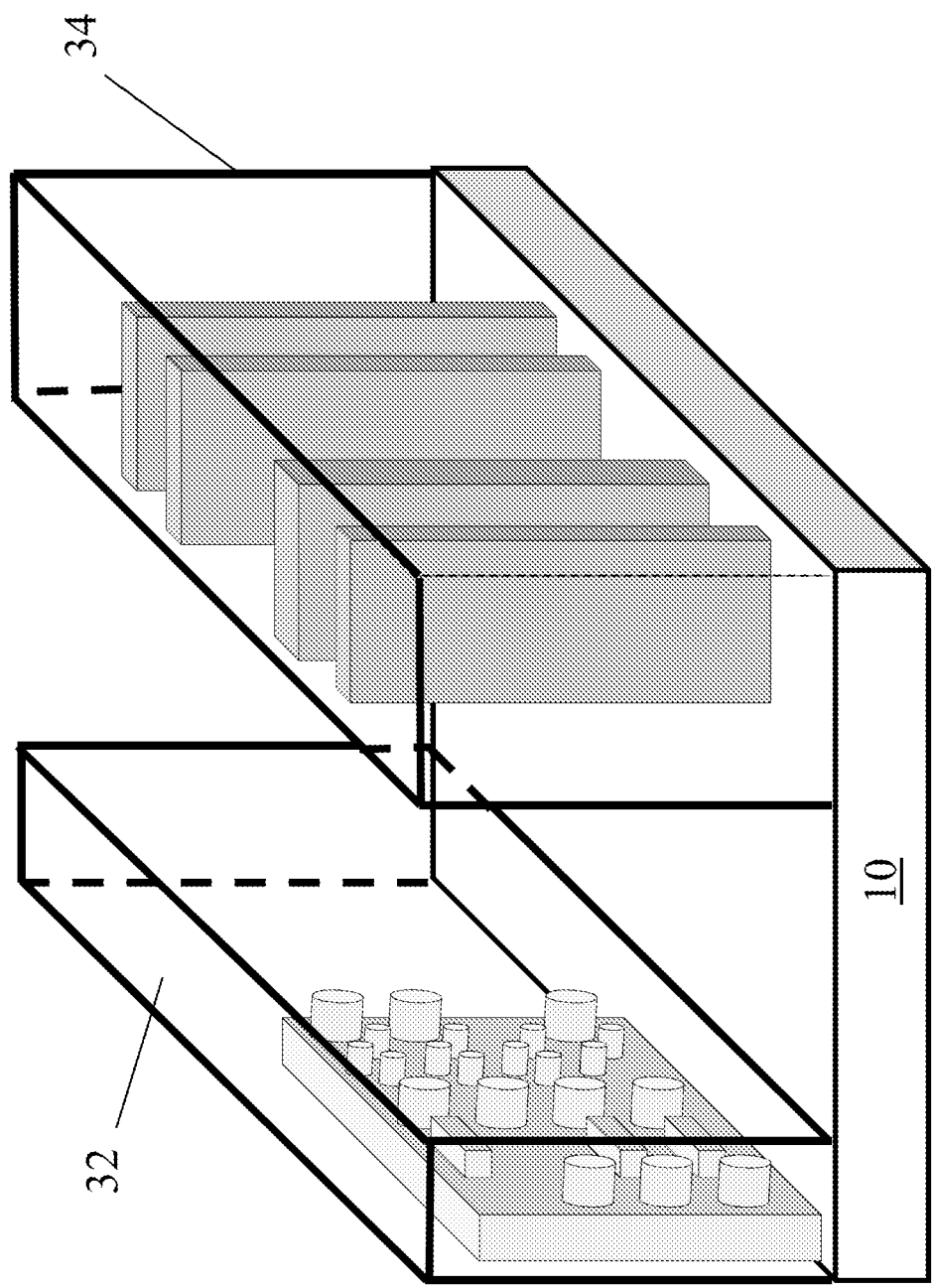
FIG. 12 is a diagram depicting the structure shown in FIG. 10, except that the fiducial indicium 20 in FIG. 10 is embedded in a sectionable material that forms a portion of a sidewall 32 of a mold and the differentiating indicia 41 and 42 are embedded in a sectionable material that forms a portion of another sidewall 34 of the mold, such that a tissue sample and tissue-embedding medium can be interposed in space between the sidewalls 32 and 34.

As with fiducial indicia, the materials from which differentiating indicia are made are not critical, other than that they should be selected to render the differentiating indicia detectable and to prevent or inhibit movement or deformation of the differentiating indicia during tissue embedding processes. The differentiating indicia can be formed directly upon a sidewall of the mold described herein (e.g., on the base, as shown in FIG. 10), or in a material that is releasibly fixed to a sidewall of the mold (e.g., in a paraffin-containing block fixed to a sidewall, as shown in FIG. 12). The precise orientation of differentiating indicia within an embedded tissue block is not critical, but it is preferable that the differentiating indicia extend substantially completely through the block perpendicularly to its anticipated planes of sectioning, so that sections of the differentiating indicia will occur in all sections.

Figure 11:
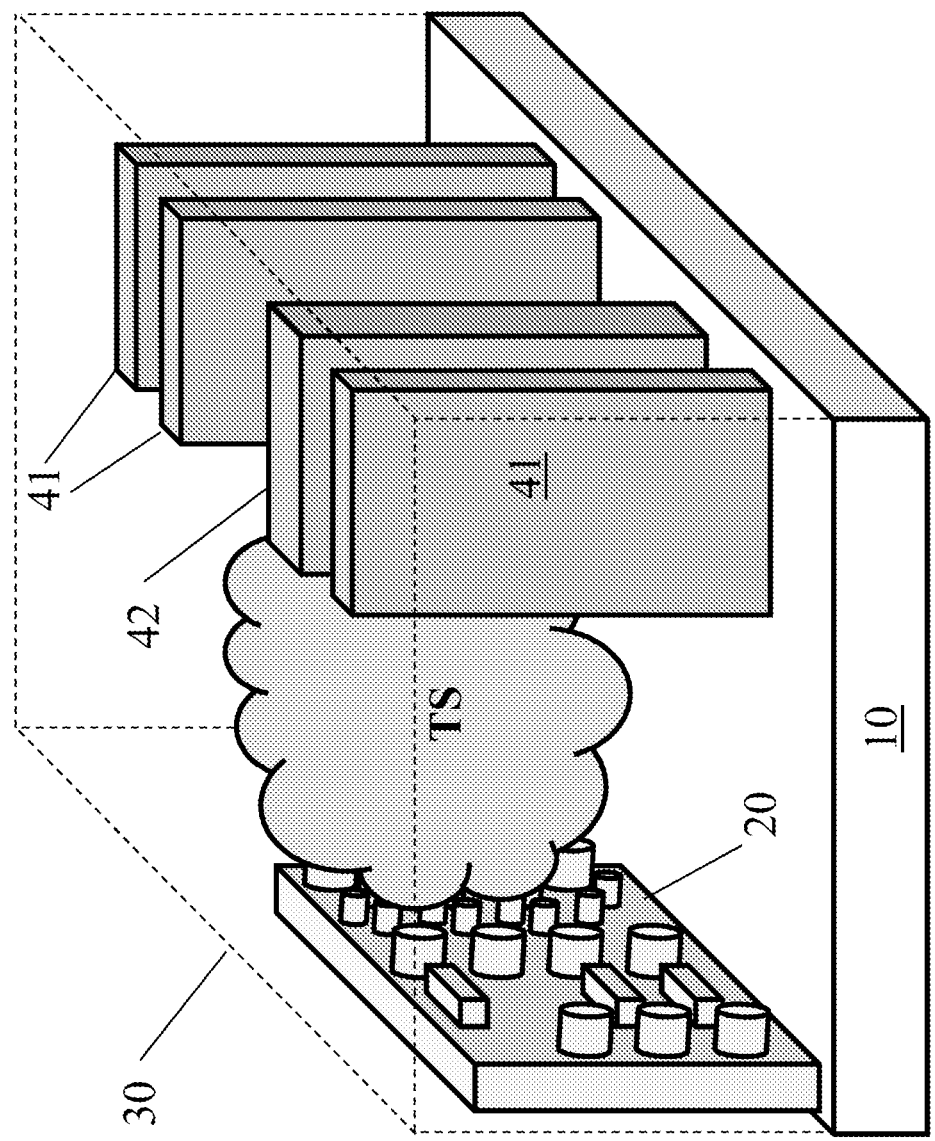
FIG. 11 is a diagram depicting the structure shown in FIG. 10, having a tissue sample TS disposed between the fiducial indicium 20 and the differentiating indicia 41 and 42 and a block of tissue-embedding medium 30 formed upon the base 10 and enveloping the tissue sample TS, the fiducial indicium 20, and the differentiating indicia 41 and 42. Sections taken parallel to the surface of the base 10 will include a section of fiducial indicium 20 that unambiguously identifies the distance of the section from the base 10 surface and sections of the differentiating indicia 41 and 42 that appear in the section in a machine-readable bar code form.

FIGS. 10-12 illustrate an example of differential indicia that are formed on into a tissue sample block. FIG. 10 shows a base 10 which is the sidewall of a mold or a portion of such a sidewall. Formed or fixed thereon are a fiducial indicium 20 and a plurality of differential indicia 41 and 42. All of the differential indicia 41 and 42 are formed from a detectable material and have the form of a rectangular column, and all thus yield a detectable rectangle if they are sectioned along a plane parallel to the base 10. In FIGS. 10-12, some of the differential indicia 41 have the form of a thinner rectangular column than another differential indicium 42, which has the form of a relatively thicker rectangular column, and the four differential indicia 41 and 42 are arranged in a linear array, with their long faces parallel to and edge-aligned with one another. Thus, when these differential indicia 41 and 42 are sectioned parallel to the base 10, the section (viewed from above the base 10, perpendicularly to the section) will include four linearly-arrayed, detectable rectangular sections, akin to a machine readable "bar code" as the term is ordinarily used in the machine vision art. Using known machine vision components (adapted to detect the detectable characteristic of the differential indicia), this bar code can be "read" by a machine. The machine-readable bar code may encode alphanumeric information which can be readily processed by a computer or data processing device. Thus, all sections taken parallel to the base 10 and including the differential indicia 41 and 42 can be determined to have been taken from the same block. Sections taken from a second block, having a different arrangement or combination of differential indicia 41 and 42, can be determined to have been taken from the second block. In this way, multiple sections can be distinguished from another, even if they are not otherwise labeled and even if the blocks from which they were taken are not available. Also, so long as the arrangement or combination of differential indicia 41 and 42 in a block is known or recorded, sections taken from that block can be identified by the arrangement or combination of differential indicia 41 and 42 in the section.

A mold may contain 1, 2, 3, 4 or more differentiable and/or fiducial indicia. An indicium can be configured to include features from both a differentiable indicium and a fiducial indicium. For example, an indicium may contain a set of rectangles for differentiating purpose and a second set of rectangles for fiduciary purpose. Distinguishable features of an indicium include light absorption, fluorescence wavelength, shape, magnetism, or a combination thereof.

The present invention also provides a kit containing the above described mold and a database. The database records information on the distinguishable feature of the indicium. Distinguishable features (e.g. light absorption, fluorescence wavelength, shape, magnetism) can be recorded in any type of database. Broadly speaking, the database can be as simple as a paper, a photo, or a drawing that depict the above features of the indicium. The database can also be a computer which stores information of the Multiple molds can be included in the kit. The database thus stores information on the distinguishable features of an indicium that correspond to individual sections of a block. Because the differentiable indicium and the fiducial indicium are readily recorded in the database, the relative position of a section can thus be determined manually or with the assistance of a computer. The relative position of a section provides information on the orientation and depth of a section within a block and distinguishes sections of one block from those of another.

The kit may further contain a scanner and a processing unit. The scanner detects the distinguishable feature of the indicium. Depending on the specific features, the scanner may detect fluorescence, magnetism, shape, pattern, or other characteristics of an indicium. The processing unit processes the detected distinguishable feature, compares with a stored or pre-recorded information, and identifies relative positions of a section and enables reconstruction of the block from multiple sections. For example, the scanner may detect a sectioned differentiable indicium containing part or whole of multiple rectangles, which serves as barcode for a particular block. The processing unit and the processing unit can communicate with each other via any interface. Both wired and wireless modes of communication are encompassed in this invention. The wireless mode also allows data processing in a facility separate from the location of detection.

Alternatively and/or additionally, the kit may further include a computer-readable non-transitory medium that contains software program instructions such as computer programs written in C, C++, Java or other computer languages. The program instructions can be executed on a computer, to operate a scanner to be able to detect the distinguishable feature of the indicium and communicate such information to a processing unit for processing the data. The processing unit may be co-located with the computer that runs the program instructions, may be co-located with the scanner (such as embedded inside the scanner), or may be a remote computer on either a server or client device that is in wireless communication with scanner. The program instructions may further cause the processing unit to compare the detected distinguishable feature communicated by the scanner with the information about one or more distinguishable features of the indicium stored in the database, and identify relative positions of sections cutting through the indicium. The present invention also provides a system which contains the above described mold and software program. The software program may be incorporated into the scanner or data processing unit/device.

Also disclosed is a method for embedding a biological sample in a settable, sectionable block. The method includes the steps of depositing the biological sample within the cavity of the mold of the present invention, filling the cavity with an amount of a settable block-former to immerse at least a portion of the biological sample therein, and thereafter subjecting the block-former to conditions sufficient to induce it to set.

EXAMPLES

The subject matter of this disclosure is now described with reference to the following Examples. These Examples are provided for the purpose of illustration only, and the subject matter is not limited to these Examples, but rather encompasses all variations which are evident as a result of the teaching provided herein.

Example 1

Figure 2:
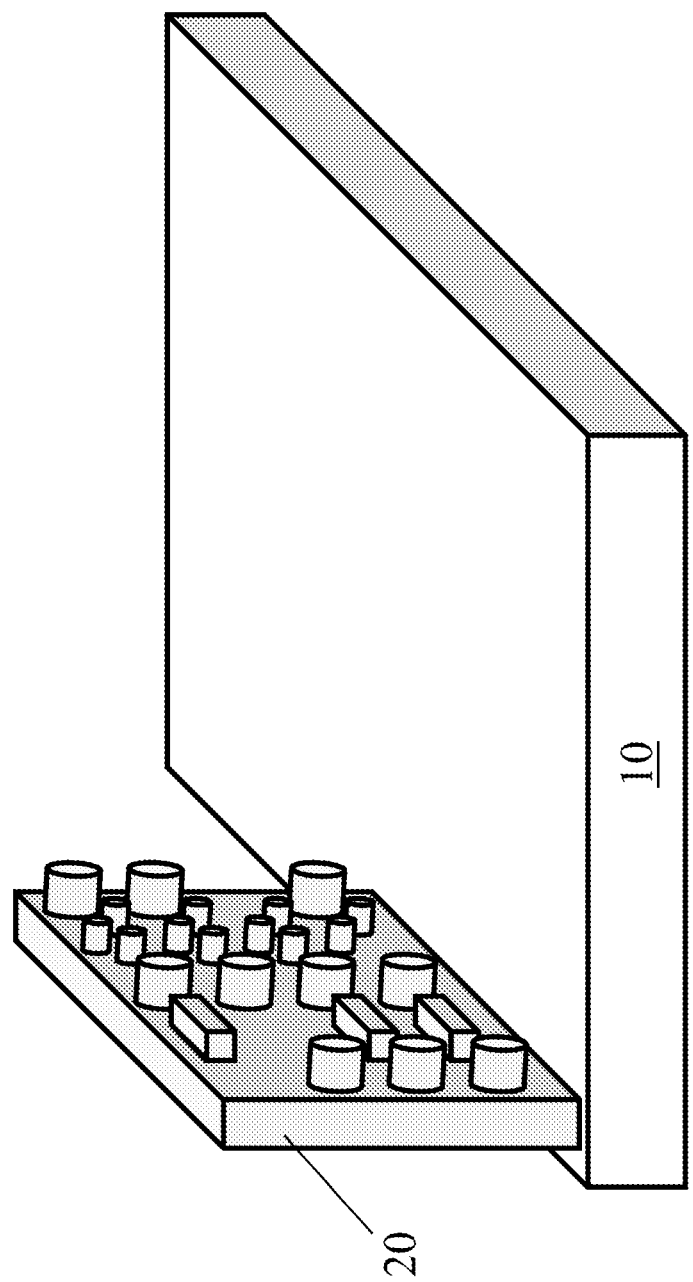
FIG. 2 is a diagram which depicts a fiducial indicium 20 resting upon a base 10 upon which a block of tissue-embedding medium can be formed.
Figure 3:
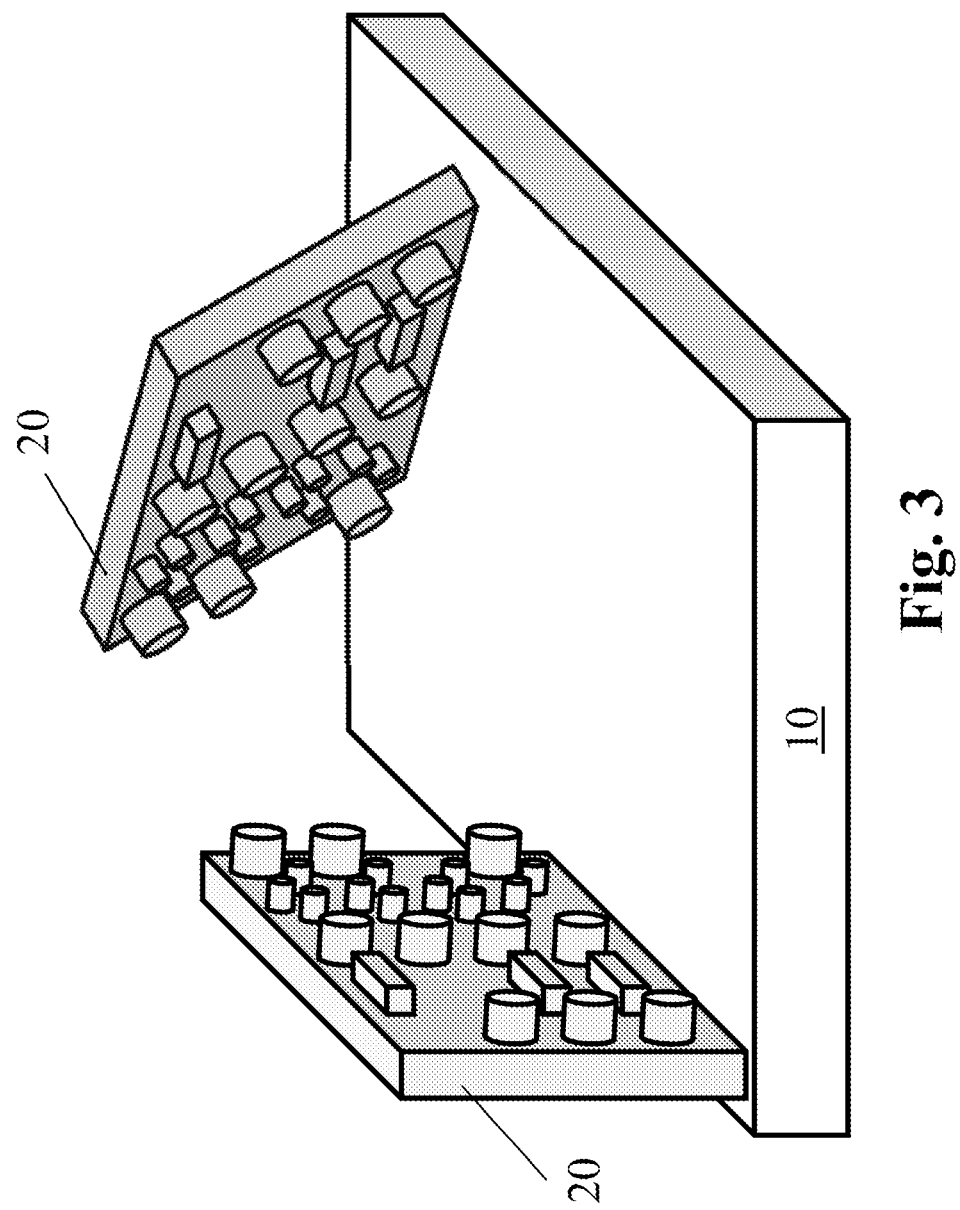
FIG. 3 is a diagram which depicts a pair of fiducial indicia 20 resting upon a base 10 upon which a block of tissue-embedding medium can be formed.

FIGS. 2-5, 8, and 9 illustrate an embodiment of the subject matter described herein. In each of these figures, a fiducial indicium 20 is fixed (releasibly or not) to a base 10. In FIG. 1, only a single indicium 20 is fixed to the base 10, and it is fixed at a known position and in a known orientation. In FIG. 2, a pair of indicia 20 are fixed to the base 10, their positions and orientations differing from each other. FIG. 4 illustrates a block 30 of settable medium that is formed upon the base 10 (the four planar sides of the block 30 being defined by four corresponding sidewalls of the mold and the planar 'top' of block 30 being defined either by an additional face of the mold or by the upper surface of settable medium within the mold). As illustrated in FIG. 4, various detectable bodies (cylinders and blocks on the face of indicium 20) extend into the block; the settable medium has set around and against these bodies.

Sections taken through the block 30 that are substantially parallel to the broad face of base 10 will include a corresponding portion of indicium 20 (except for sections taken very near the 'top' of block 30, at the surface farthest from base 10). The variegated shapes of the bodies extending from indicium 20 differ for the various sections so taken. As a result of this, the pre-sectioning position of any section within the block 30 can be determined by analyzing the shapes of the bodies which occur in that section (again, except for sections taken near enough the 'top' of block 30 that the sections do not include any portion of indicium 20). FIG. 5 illustrates that if a tissue sample TS is embedded within the block 30, then the sections discussed in this paragraph may include portions of the tissue sample TS; by determining the pre-sectioning positions of a section, the pre-sectioning positions of portions of the tissue sample TS can similarly be determined.

FIG. 8 illustrates that inclusion of multiple fiducial indicia 20 within the block 30 permits determinations of pre-sectioning positions of opposite ends of sections taken roughly parallel to the broad face of base 10. Determination of the pre-sectioning positions of opposite ends of roughly uniformly-thick, slab-shaped sections permits detection of non-parallel (relative to base 10) sectioning. Similarly, analysis of the detectable bodies present in opposite ends of sections taken roughly parallel to the broad face of base 10 permits detection of non-uniformly-thick sections.

FIG. 9 illustrates that inclusion of multiple fiducial indicia 20 within the block 30 can permit determination of pre-sectioning positions of sections taken through the block, even when those sections are not taken parallel to base 10.

Example 2

FIGS. 6A, 6B, and 7 illustrate embodiments of the subject matter in which at least one sidewall 32 of a mold used to contain settable, sectionable medium can be and used to orient one or more fiducial indicia 20.

In the embodiment shown in FIGS. 6A and 7, one or more mold sidewalls 32 is made from a sectionable material and formed against a base 10 to partially or completely define a space within which the block 30 can be formed. A fiducial indicium 20 can be positioned within the sidewall 32, so that its position is not altered when the block 30 is formed within the space, as shown in FIGS. 6A and 7. The block 30 and sidewall 32 (including indicium 20) can sectioned simultaneously.

Alternatively, as shown in FIG. 6B, a fiducial indicium 20 can be positioned against a sidewall prior to block 30 formation. In this embodiment, the sidewall 32 need not be made from a sectionable material (it can, instead be a rigid plastic or metal or an elastomer), and can be removed from the block 30 after its formation and prior to sectioning it (with indicium 20 embedded therein).

The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A mold for embedding a biological sample in a settable, sectionable medium, the mold comprising a first sidewall and defining a cavity for containing the biological sample and the medium during an embedding process, the first sidewall having a cavity-side face that defines at least a portion of the cavity and that has fixed thereto a sectionable, detectable indicium that remains fixed to the cavity-side face of the sidewall during the embedding process, and substantially retains its shape during the embedding process, whereby a block can be formed by embedding the biological sample in the medium within the mold cavity.

2. The mold of claim 1, wherein at least one applies: (a) the indicium extends into the cavity and is fixed to a substantially planar portion of the cavity-side face of the first sidewall; (b) the indicium is a differentiating indicium configured to differentiate one mold from another.

3. The mold of claim 2, wherein the cavity is defined by the first sidewall and one or more additional sidewalls.

4. The mold of claim 2, wherein at least one applies: (a) the first sidewall is a plate and the cavity is defined by the first sidewall and at least one additional sidewall that abuts against the cavity-side face of the plate; (b) the first sidewall is a glass plate and the mold further comprises four additional sidewalls which define a rectangular cuboidal cavity when the additional sidewalls are opposed abutted against the cavity-side face of the glass plate.

5. The mold of claim 2, wherein the differentiating indicium in (b) comprises one or a plurality of projected alphanumeric characters extending away from the cavity-side face of the first sidewall.

6. A kit comprising a multiplicity of the molds of claim 5, wherein no two of the molds include identical pluralities of projected alphanumeric characters.

7. The mold of claim 2, wherein the differentiating indicium in (b) comprises a plurality of holes or projected rectangles extending away from the cavity-side face of the first sidewall, the projected rectangles being arranged parallel to one another in a row.

8. The mold of claim 7, wherein the plurality of projected rectangles are arranged such that sections taken through the plurality of projected rectangles obtain identical machine-readable bar codes.

9. The mold of claim 1, wherein at least one of the sidewalls is compatible to attach directly to a sectioning device.

10. A kit comprising a multiplicity of the molds of claim 9, wherein no two of the molds include bar codes that encode identical alphanumeric information.

11. The mold of claim 1, wherein the indicium is a fiducial indicium having a shape that includes a plurality of differentiable, detectable bodies at known positions on the fiducial indicium.

12. The mold of claim 11, wherein the fiducial indicium has a shape that includes a multiplicity of differentiable, detectable bodies at known positions on the fiducial indicium, whereby parallel planar sections that extend through the block and intercept the fiducial indicium can be unambiguously differentiated from one another.

13. The mold of claim 12, wherein at least one applies: (a) the detectable bodies are selected from the group consisting of a hole, a triangle, a circle, a square, a rectangle, a number, a letter, a figure, or any combination thereof; (b) the fiducial indicium also serves as a differentiating indicium by further comprising a plurality of projected rectangles, said plurality of projected rectangles are arranged such that sections taken through the plurality of projected rectangles obtain identical machine-readable bar codes.

14. The mold of claim 1, wherein at least one applies: (a) the mold comprises a plurality of indicia which exhibit a distinguishable feature selected from the group consisting of light absorption, fluorescence wavelength, shape, and magnetism; (b) the indicium comprises a negative feature; (c) the mold comprises a plurality of differential indicia or fiducial indicia fixed to the cavity-side face of the first sidewall; (d) the mold comprises a plurality of differential indicia or fiducial indicia fixed to the cavity-side face of two or more of a plurality of discrete sidewalls; (e) the indicium is embedded in a sectionable medium that is releasibly fixed to at least the first sidewall.

15. A kit comprising the mold or a multiplicity of the molds of claim 1 and a database, wherein said database contains information on at least one distinguishable feature of the indicium, said distinguishable feature selected from the group consisting of light absorption, fluorescence wavelength, shape, magnetism, and any combinations thereof.

16. The kit of claim 15, comprising a multiplicity of the-molds, wherein no two of the molds include identical indicium.

17. The kit of claim 15, further comprising a scanner and a processing unit, wherein the scanner is configured to detect the distinguishable feature of the indicium and communicate with the processing unit, and the processing unit processes the detected distinguishable feature and identifies relative positions of sections cutting through the indicium.

18. The kit of claim 17, wherein the scanner and the processing unit are in wireless communication.

19. The kit of claim 15, further comprising a computer-readable non-transitory medium containing program instructions that, when executed by a processing unit:
cause a scanner to detect the distinguishable feature of the indicium;
cause the scanner to communicate the detected distinguishable feature with a processing unit;
cause the processing unit to identify relative positions of sections cutting through the indicium based on the detected distinguishable feature and information in the database.

20. A method for embedding a biological sample in a settable, sectionable block, the method comprising depositing the biological sample within the cavity of the mold of claim 1 and filling the cavity with an amount of a settable block-former to immerse at least a portion of the biological sample therein, and thereafter subjecting the block-former to conditions sufficient to induce it to set.

* * * * *